(12) United States Patent
Gossett Dalton, Jr. et al.

(10) Patent No.: US 6,426,955 B1
(45) Date of Patent: Jul. 30, 2002

(54) INTERNET TELEPHONY CALL ROUTING ENGINE

(75) Inventors: James Pleasant Gossett Dalton, Jr.; Alcina de Figueiredo Dalton, both of Atlanta; Stephen Anthony Thomas, Marietta; Maria Osterholt Cown, Austell; Rich Carroll Vaughn, Roswell; Pawel Szczerbina, Atlanta; Brian Keith Lovette, Duluth, all of GA (US)

(73) Assignee: Transnexus, Inc., Atlanta, GA (US)

( * ) Notice: Subject to any disclaimer, the term of this patent is extended or adjusted under 35 U.S.C. 154(b) by 0 days.

(21) Appl. No.: 09/154,564

(22) Filed: Sep. 16, 1998

Related U.S. Application Data

(60) Provisional application No. 60/059,087, filed on Sep. 16, 1997.

(51) Int. Cl.[7] ............................................. H04L 12/28
(52) U.S. Cl. ...................... 370/401; 370/352; 379/133; 379/114
(58) Field of Search ................................ 370/401, 400, 370/351, 352, 353, 356, 230, 252, 259, 261, 267, 271; 709/223, 224, 227, 228; 379/111, 112, 133, 220, 221, 86.13, 258, 243, 244

(56) References Cited

U.S. PATENT DOCUMENTS 5,434,848 A  7/1995  Chimento, Jr. et al. ....... 370/17

(List continued on next page.)

FOREIGN PATENT DOCUMENTS

| WO | WO 97/14236 | 4/1997 |
|---|---|---|
| WO | WO 97/23078 | 6/1997 |
| WO | WO 98/36543 | 8/1998 |

OTHER PUBLICATIONS

Thom, "H.323: The Multimedia Communications Standard for Local Area Networks," IEEE Communications Magazine, Dec. 1996, pp. 52–56.

(List continued on next page.)

Primary Examiner—Douglas Olms
Assistant Examiner—Ricardo M. Pizarro
(74) Attorney, Agent, or Firm—King & Spalding

(57) ABSTRACT

The present invention discloses a centralized routing engine that is able to assist gateways in making routing decisions for calls being placed in an IP network environment. Types of calls include voice, fax, video, etc. The routing engine provides significant flexibility to the gateways by allowing the gateways to designate preferences that define operational limits or requirements. A source gateway operator may set preferences such as the maximum price that is willing to be paid for a call, the maximum delay that will be tolerated and the maximum autonomous system hop count that will be tolerated. A destination gateway operator is likely only to be concerned with setting price schedules as preferences. Gateway operators may also set 'preference criteria,' which define the circumstances in which a certain set of preferences is to be applied. Based on preferences and preference criteria, the routing engine is able to locate destination gateways that are eligible to terminate a voice over telephony IP call. The routing engine provides a prioritized list of eligible destination gateways to the source gateway. The source gateway then works through the prioritized list and attempts to set up the voice over IP telephony call with each eligible destination gateway, until the call is established.

49 Claims, 12 Drawing Sheets

U.S. PATENT DOCUMENTS

| | | | | |
|---|---|---|---|---|
| 5,943,657 | A | * 8/1999 | Freestone | 705/400 |
| 5,966,427 | A | * 10/1999 | Shaffer | 379/15.05 |
| 6,005,925 | A | * 12/1999 | Johnson | 379/112 |
| 6,005,926 | A | * 12/1999 | Mashinsky | 379/114 |
| 6,049,531 | A | * 4/2000 | Roy | 370/260 |
| 6,128,304 | A | * 10/2000 | Gardell | 370/401 |
| 6,178,510 | B1 | * 1/2001 | O'Connor | 713/201 |
| 6,240,449 | B1 | * 5/2001 | Nadeau | 709/223 |

OTHER PUBLICATIONS

Rudkin, et al., "Real–time applications on the Internet," BT Technology Journal, vol. 15, No. 2, Apr. 1997, pp. 209–225.

The Ascend Max Voice Gateway, XP–002096239, "The asnet pipeline," www.asnet.co.nz/pipeline/sum97/tam-vg.html, Mar. 11, 1999.

Hansson, et al., "Phone Doubler—A step towards integrated Internet and telephone communities," Ericsson Review No. 4, 1997, pp. 142–151.

* cited by examiner

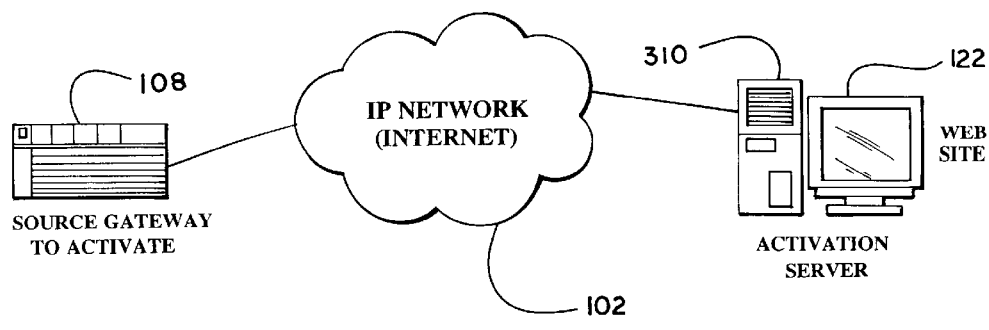
(501) DEVICE REQUESTS DOWNLOAD
(502) SERVER ADDS ID TO BINARY PROGRAM
(503) SERVER DIGITALLY SIGNS BINARY PROGRAM
(504) SERVER DISTRIBUTES ACTIVATION PROGRAM
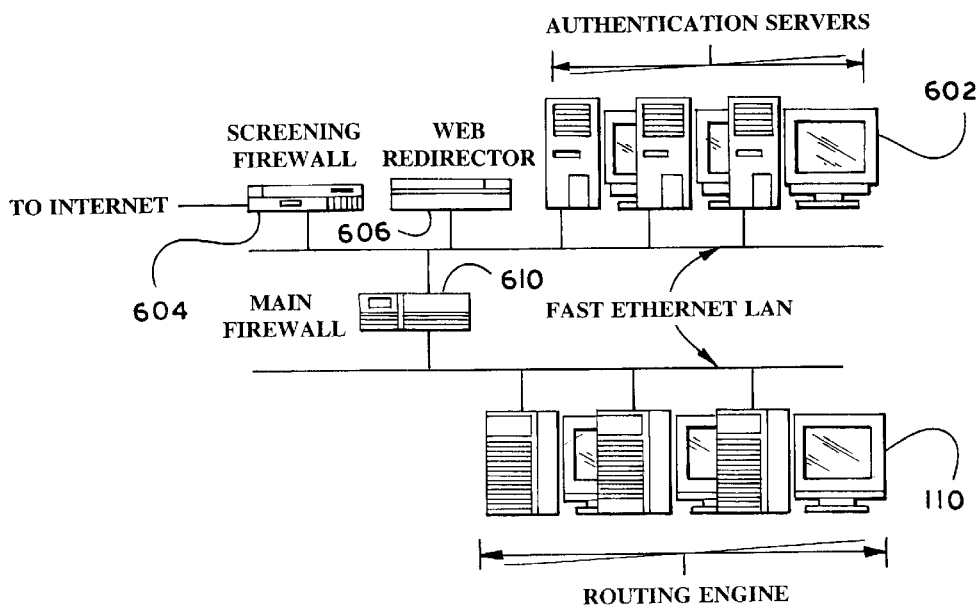

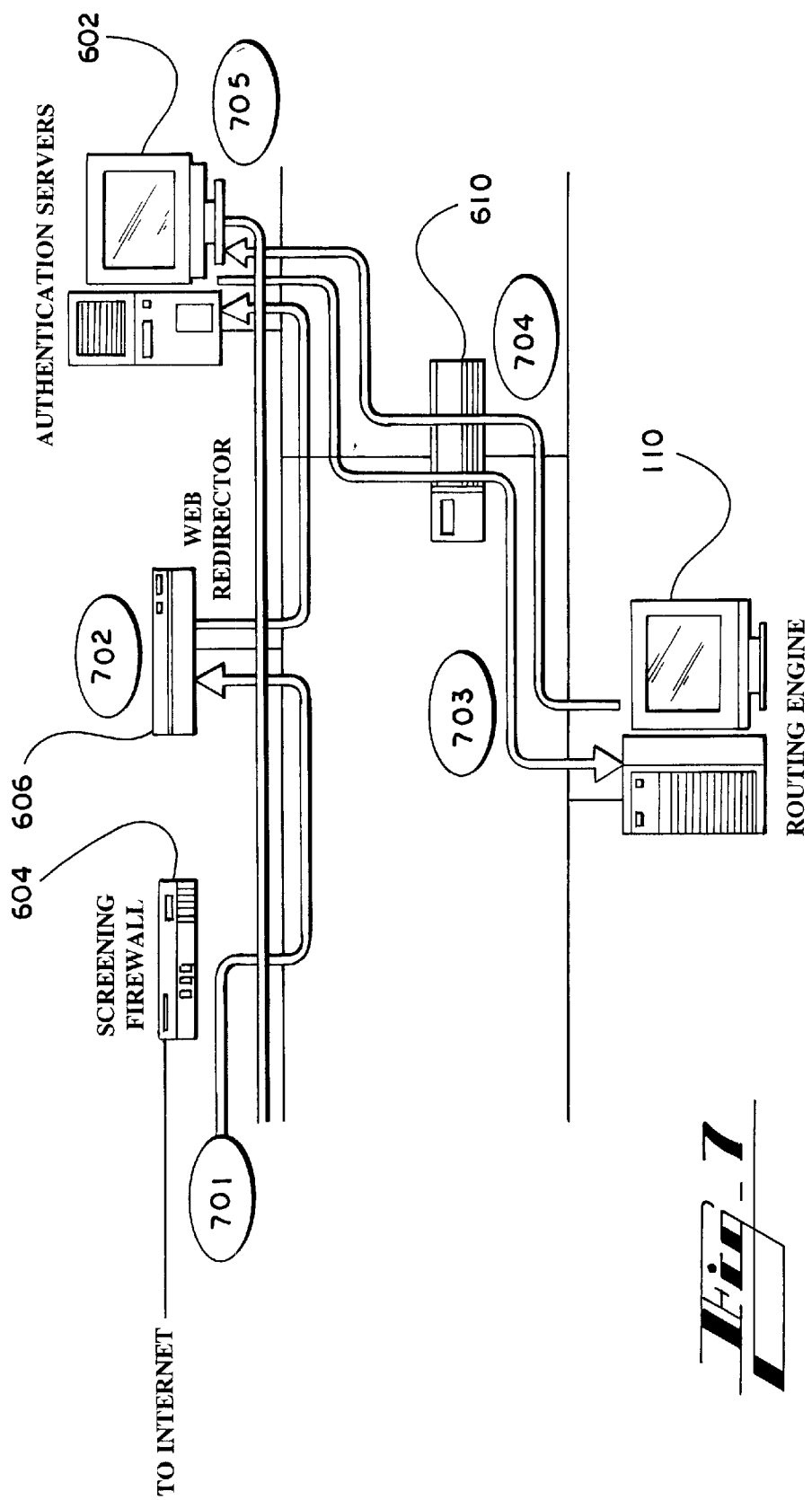

| SOURCE GATEWAY ID | PREFIX | EFFECTIVE DATE | START DAY | START HOUR | END DAY | END HOUR | LONGEST PREFIX | PRICE | TIME UNIT | #ENTRIES | OFFSET |
|---|---|---|---|---|---|---|---|---|---|---|---|
| 1 | 1404 | 1/1/98 | 1 | 0 | 7 | 23 | 6 | .20 | 0.2 | 3 | 0 |
| 1 | 1770 | 12/1/97 | 4 | 12 | 6 | 23 | 6 | .30 | 1.0 | 3 | 1 |
| 1 | 177095 | 11/1/97 | 6 | 15 | 7 | 23 | 6 | .25 | 1.5 | 3 | 2 |

| TERMINATING NUMBER PREFIX | DESTINATION GATEWAY ID | OTHER DATA |
|---|---|---|
| 1770 | 1 | ... |
| 1770 | 2 | ... |
| 46 | 1 | ... |
| 46 | 2 | ... |

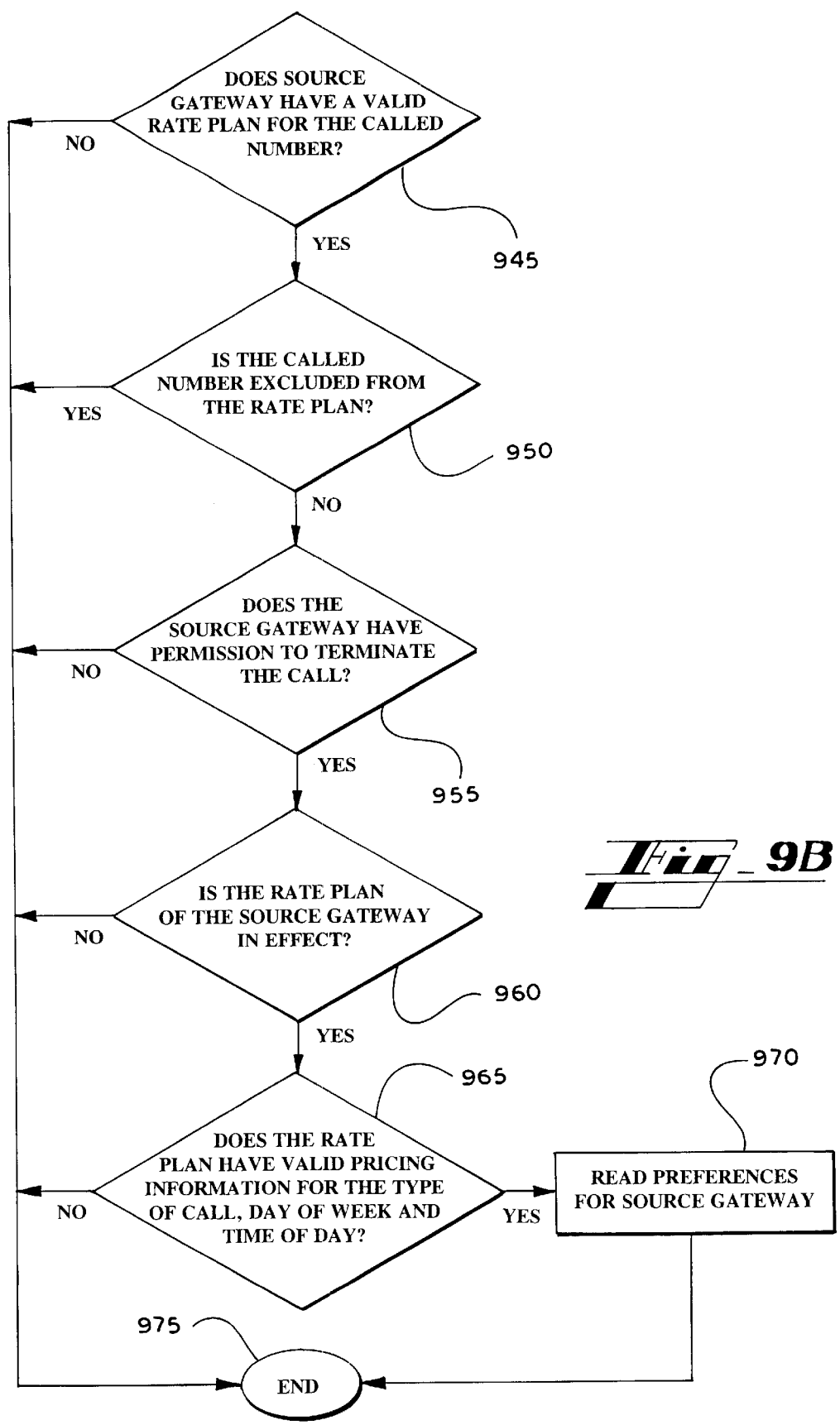
Fig_9B

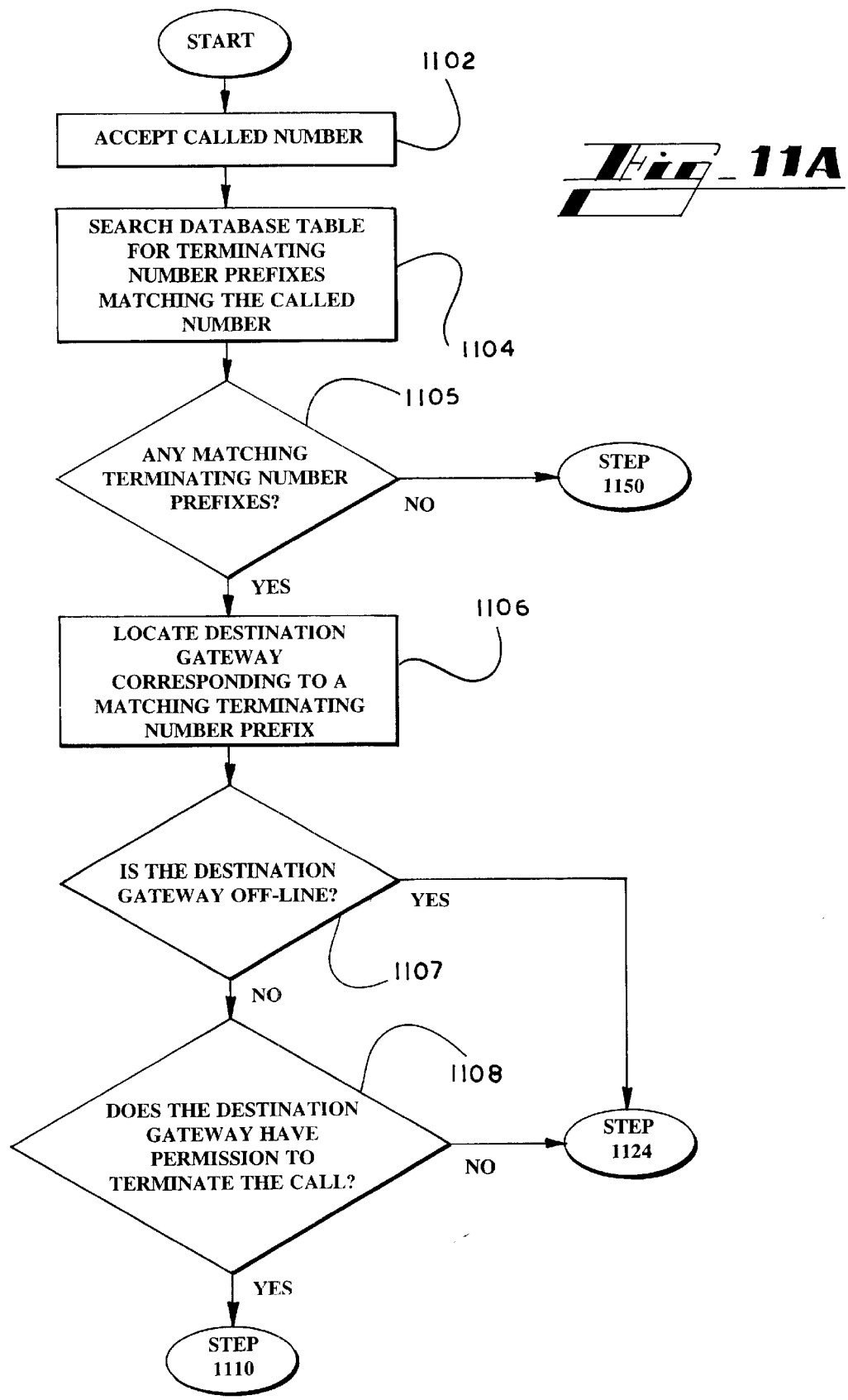

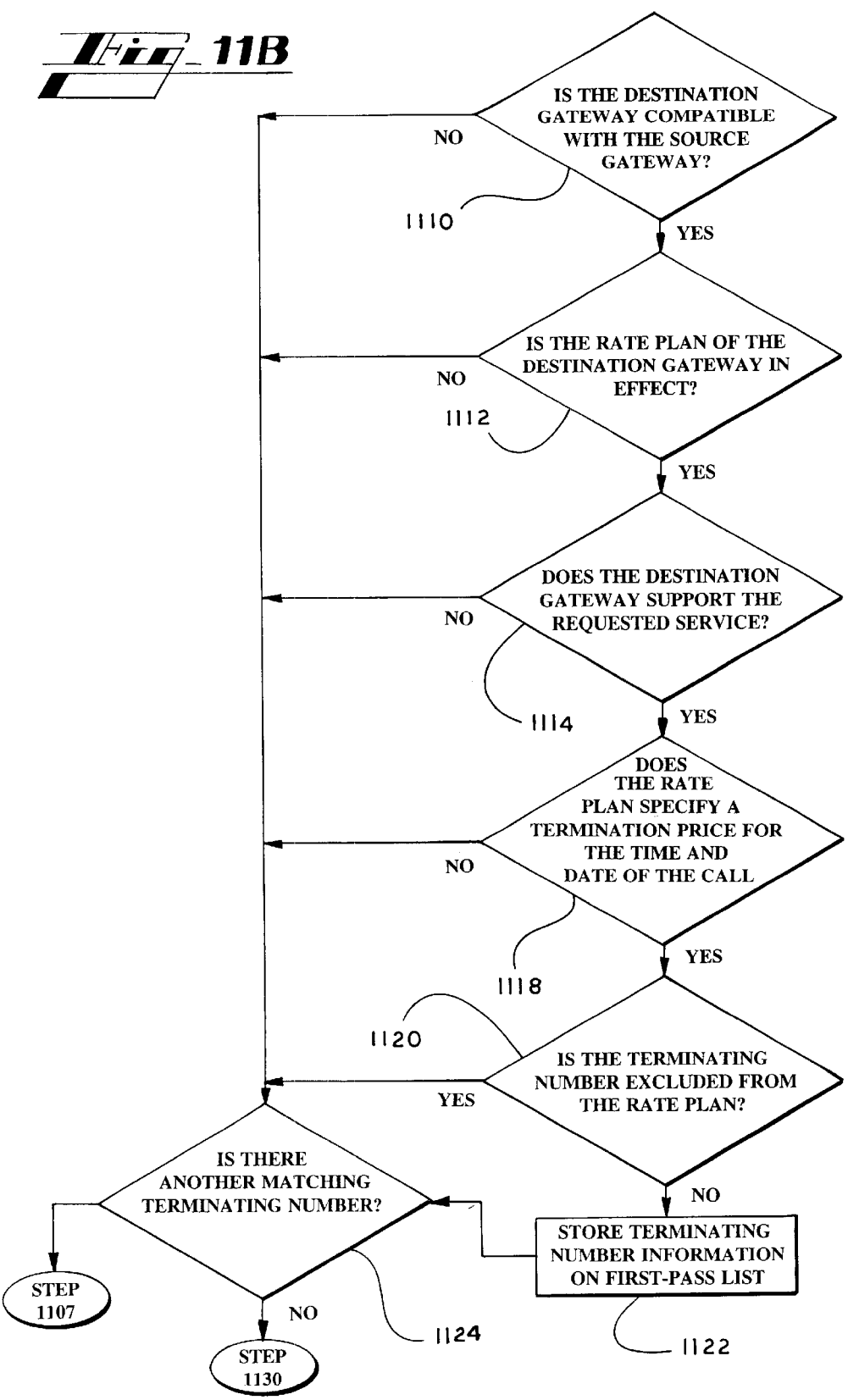
Fig_11B

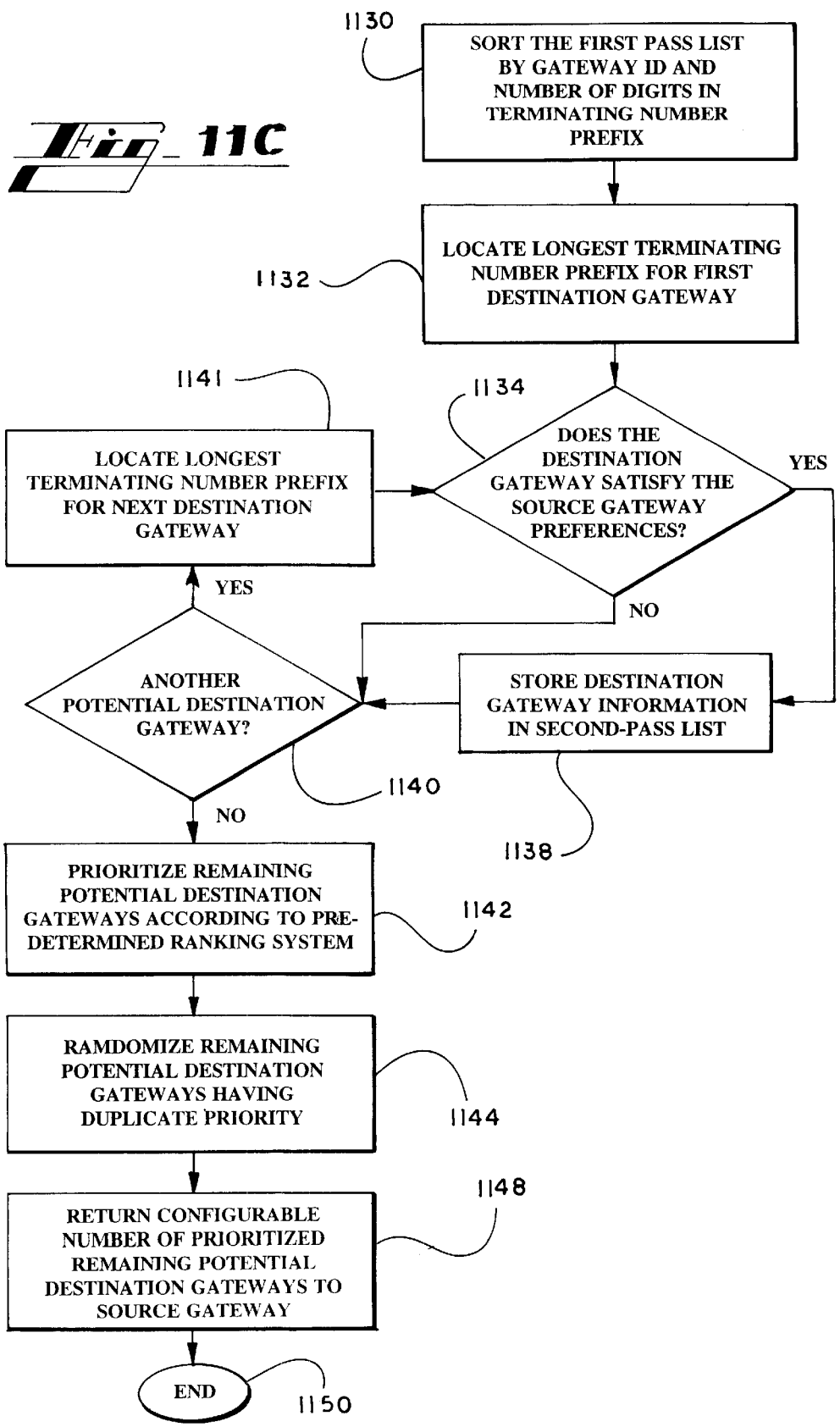

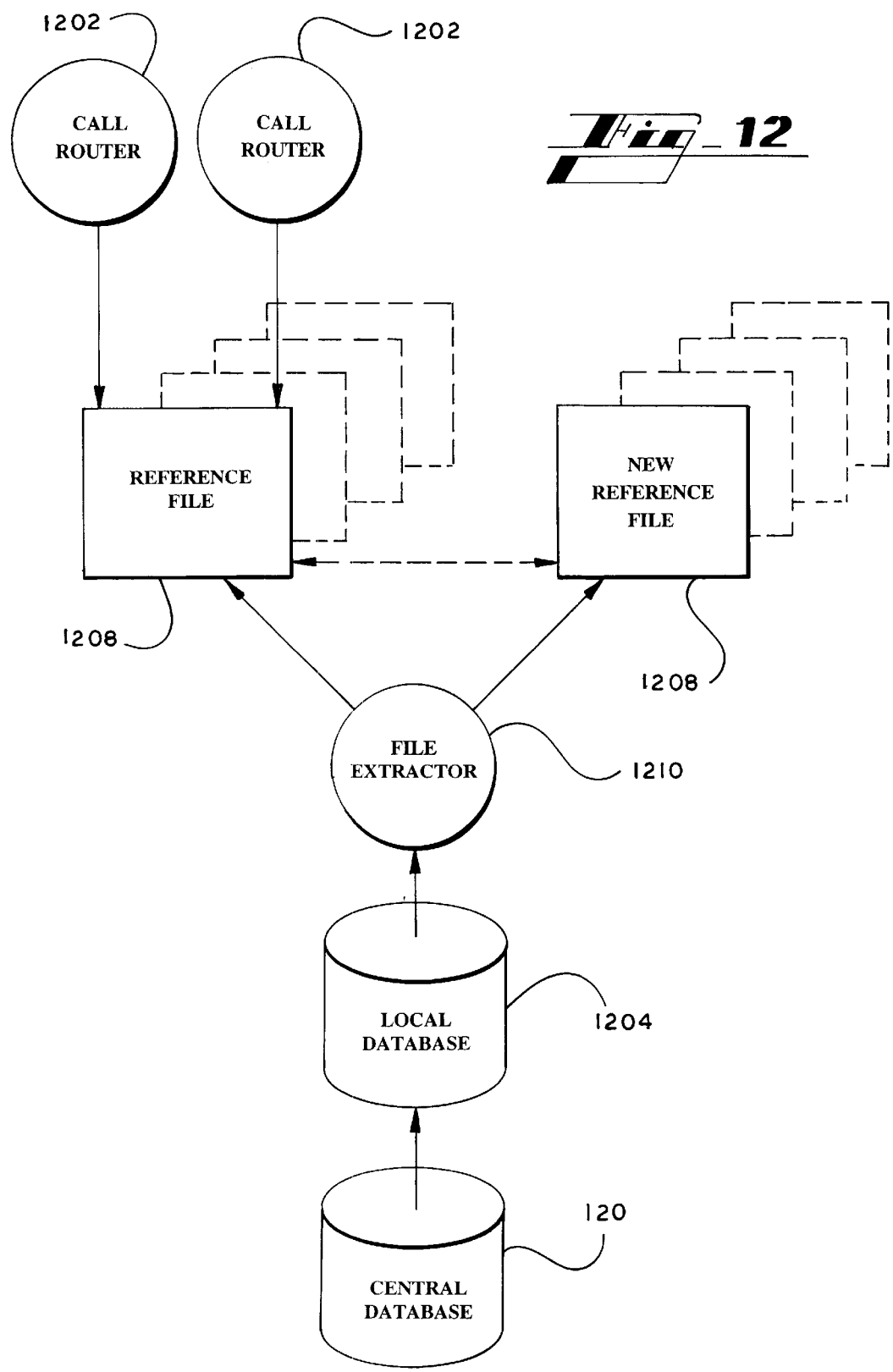

INTERNET TELEPHONY CALL ROUTING ENGINE

RELATED APPLICATIONS

The present application claims priority to provisional patent application entitled "Internet Communications Clearinghouse System", filed on Sep. 16, 1997 and assigned U.S. application Ser. No. 60/059,087, and is related to application entitled "Gatekeeper for Internet Clearinghouse Communications System" filed on Sep. 16, 1998 and assigned U.S. application Ser. No. 09/154,566, now abandoned.

TECHNICAL FIELD

The present invention generally relates to voice over IP communications. More particularly, the present invention relates to a routing engine to assist in the routing of voice over IP communications from a source gateway to a destination gateway.

BACKGROUND OF THE INVENTION

As an alternative to traditional switched circuit networks, telecommunications service providers have discovered that voice telephone calls may be routed over IP networks. Due to the fact that the Internet is not presently subject to the same international regulations as are traditional telephone networks, routing telephone calls over the Internet tends to be less expensive. Additionally, an IP routed voice telephone call requires much less bandwidth, and thus less cost, than a voice telephone call placed over a traditional telephone network. Further, IP technology advances and is entered into the marketplace at a much faster rate than traditional telecom technology. Thus, in order to be competitive, telecommunications service providers have begun to use IP routing as a way to offer customers access to the latest technological improvements.

Presently, however, there is no centralized system for routing voice telephone calls over an IP network. Each operator of a gateway is responsible for determining the routes for its own outgoing calls. Typically, gateway operators rely on traditional IP routing algorithms, which are designed to handle routing of computer generated data packets. Traditional IP routing algorithms attempt to strike a balance between the concerns of minimum delay and maximum reliability. Thus, using traditional IP routing algorithms, a voice telephone call will be routed to any destination gateway that happens to satisfy a set of predetermined shortest path and acceptable data loss parameters.

The routing of voice telephone calls, however, involves a significant concern that is not shared by traditional IP routing algorithms. This additional concern is the monetary cost of routing a voice call to a particular destination gateway. As in traditional switched circuit networks, Internet telephony gateways impose fees for the service of terminating a voice call. Traditional IP routing algorithms are not able to detect and compare the varying price schedules that may be imposed by various Internet telephony gateways. Thus, source gateways are not able to discriminate between destination gateways based on monetary costs.

Thus, there remains a need in the art for voice over IP routing that is able to balance financial concerns with concerns for minimum delay and maximum reliability.

There also remains a need in the art for a centralized system for assisting gateway operators with routing decisions.

SUMMARY OF THE INVENTION

The present invention relates to a routing engine connected to an IP network, such as the Internet, that provides gateways with assistance in the routing and billing of voice over IP transactions. The novel routing engine provides a source gateway with a prioritized list of destination gateways that are eligible to terminate a voice telephone call. The routing engine locates eligible destination gateways by gathering and matching information relating to "preferences" from various gateway operators. For a source gateway, preferences may be the maximum price that will be paid for a given call, the maximum delay that will be tolerated for the call and the maximum autonomous system hop count that will be tolerated. For a destination gateway operator, the most relevant preference is the price charged for access to the destination gateway.

Gateway operators may also designate "preference criteria," which define the circumstances in which a given set of preferences are to apply. Preference criteria may relate to the identification of a particular gateway, a particular called number prefix, a particular time of day and/or day of the week. Thus, for example, a source gateway operator may specify that all calls place from a particular source gateway will only tolerate a stated amount of delay and will only incur a set amount of costs. Also, a destination gateway operator may specify that a certain price will be charged for access to a certain gateway at a certain time of day, or for calls placed to a specific geographic region, or even for calls placed to a specific telephone number. Routing, and thus billing, flexibility is virtually limitless due to the designation of preferences and preference criteria.

Gateway operators designate preferences and preference criteria through a web-site that is related to the routing engine, or through other electronic transfer means. The preferences and preference criteria are then transferred to a centralized database that is accessible to all routing engines that may be distributed around an IP network. Geographically distributed routing engines are desirable in order to handle requests for routing assistance from geographically diverse gateways. Additionally, at a given location, a scalable number of routing engines may be coupled together, so as to process a multitude of routing requests with speed and efficiency.

Thus, it is an object of the present invention to provide routing that is able to account for financial concerns as well as signal delay and quality of communications service. It is a further object of the present invention to provide a centralized service point to assist gateways in the process of making voice over IP routing decisions.

These and yet other objects, features and advantages of the present invention will become apparent from reading the following specification, taken in conjunction with the accompanying drawing.

BRIEF DESCRIPTION OF THE DRAWING

FIG. 5 illustrates the steps involved in the activation of a UNIX-based source gateway;

FIG. 6 shows the general architecture of a service point;

FIG. 7 illustrates the overall message flow within a service point;

FIG. 9B is a continuation of FIG. 9A;

FIG. 11A shows an exemplary method that may be used by a routing engine to locate eligible gateways in a database table;

FIG. 11B is a continuation of FIG. 11A;

FIG. 11C is a continuation of FIG. 11B;

FIG. 12 describes the internal architecture of an exemplary routing engine.

DETAILED DESCRIPTION OF THE EXEMPLARY EMBODIMENTS

The present invention relates to a routing engine for routing telephony calls from a source gateway to a destination gateway via an IP network. A telephone call occurring via an IP network is often referred to as a "voice over IP" transaction. When a "voice over IP" transaction specifically involves the Internet, the description "Internet telephony" may also used to describe the transaction. An exemplary embodiment of the routing server will be described with respect to Internet telephony. However, the principles of the routing engine of the present invention apply to all IP routed transactions, including, but not limited to, "voice over IP" calls, "fax over IP" calls, and "video over IP calls."

Exemplary Operating Environment

Figure 1:
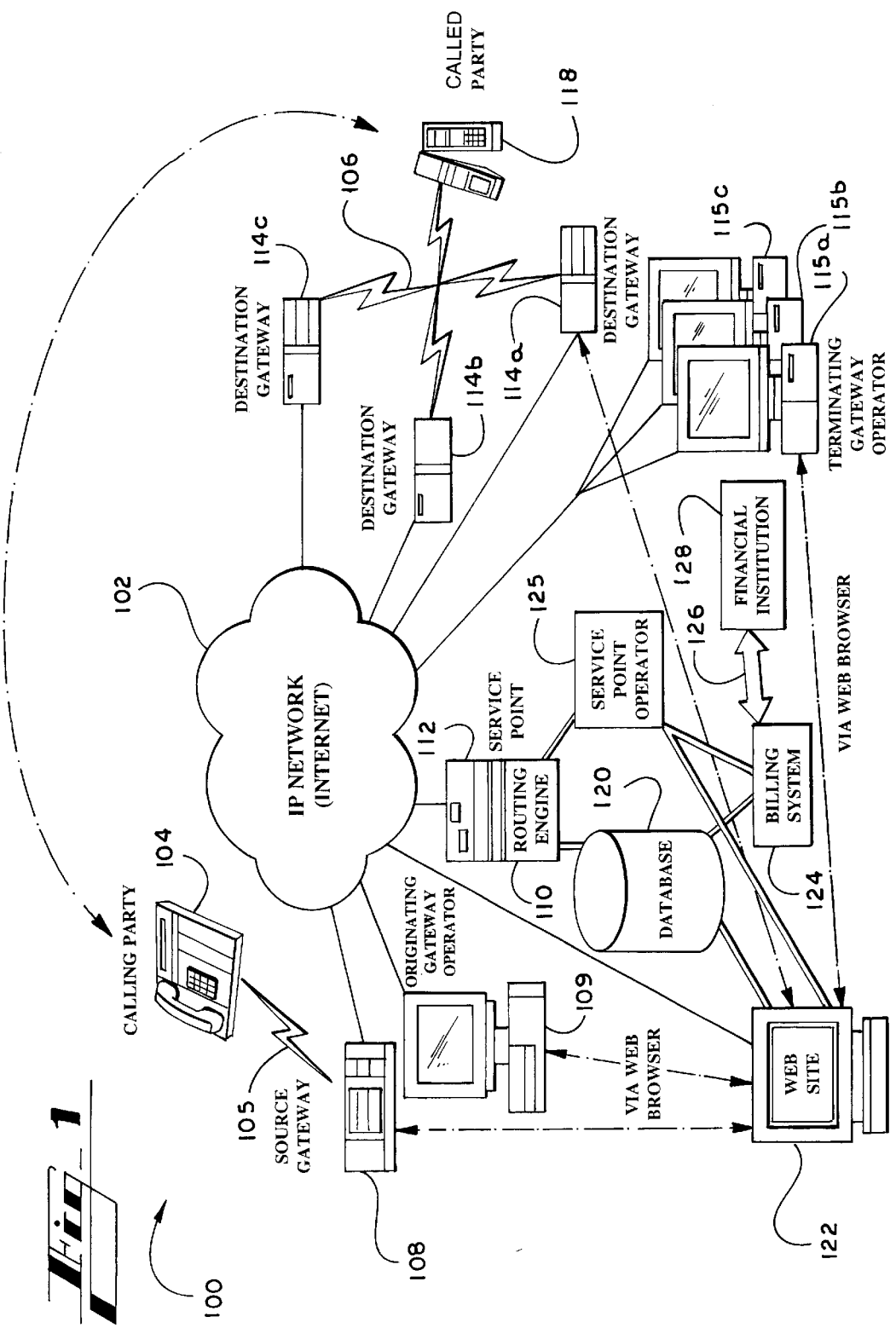
FIG. 1 is a schematic representation of an exemplary operating environment for the present invention.

The following description of an exemplary operating environment and exemplary embodiments of the present invention will refer to the drawing, in which like numerals indicate like parts throughout the several figures. Referring thereto, FIG. 1 shows an network architecture that serves as an exemplary operating environment for the routing engine of the present invention. As indicated, the Internet 102 serves as the heart of the exemplary network architecture. Relying on the Internet 102 are five different systems that might participate in an Internet Telephony transaction. These five systems include: a calling party 104, a source gateway (also referred to as an originating gateway) 108, a service point 112 including a routing engine 110, a destination gateway (also referred to as a terminating gateway) 114 and a called party 118. As FIG. 1 shows, a service point 112 is coupled to a central database 120, which is also coupled to a billing and settlement system 124. While the service point 112 exists on the public Internet 102, the central database 120 and the billing and settlement system 124 remain in secured facilities. Private communication paths connect the remote equipment with the central database 120.

The calling party 104 represents the user wishing to place a telephone call. Often, the calling party 104 will rely on a standard telephone handset to place the call. In fact, in many cases the calling party 104 may not be able to distinguish Internet telephony service from standard telephone service. The calling party 104 connects to a source gateway 108 through a public telephone network 105, such as a switched circuit network. In either case, the source gateway 108 serves as a bridge between ordinary telephones and the Internet 102 by converting telephone signals into data packets (and vice versa) and transmitting the data packets over the Internet 102. A source gateway is operated by a source gateway operator 109.

Similarly, the called party 118 is the user that receives a telephone call. A called party 118 connects to a destination gateways 114 through a public telephone network 106, such as a switched circuit network. A destination gateway 114 is connected to the Internet 102 at a location that is remote from the source gateway 108. The destination gateway 114 is operated by a destination gateway operator 115 and performs the same functions as the source gateway 108, i.e., bridging phone calls between the Internet 102 and a public telephone network 106, or an equivalent thereof. Destination gateways 114 differ from source gateways 108 only in the role played in a particular call. In particular, source gateways 108 act on behalf of the calling party 104, while destination gateways 114 act on behalf of the called party 118. It is important to note that the same operator need not manage both the source gateway 108 and the destination gateway 114. In fact, the exemplary routing engine 110, is tailored for environments in which different owners operate the two types of gateways.

The service point operator 125 may be a third party that is independent of the operators of the source gateway 108 or destination gateways 114. As indicated in FIG. 1, the service point operator may maintain a private communications line with the service point 112, the billing and settlement system 124 and a related web-site 122. In the exemplary operating environment, all components maintained by the service point operator 125, i.e., the service point 112, the database 120, the billing and settlement system 124 and the web-site 122, are conveniently distributed between various geographic locations. Still, those skilled in art will appreciate that all components maintained by the service point operator 125 may be incorporated in a single system (service point 112) or any number of distributed systems.

A service point 112 communicates with gateways over the Internet 102 and generally provides routing information to the source gateway 108. Given a destination phone number and other requirements (described in detail below), the service point 112, through the routing engine 110, identifies at least one appropriate destination gateway 114 to handle the telephone call.

The overall network architecture that serves as an operating environment for the exemplary routing engine 110 may be thought of as comprising three different networks, each carrying the telephone conversation. The first network is the calling party's telephone network 105 that connects the calling party to the source gateway 108. The second network is the Internet 102, which connects the source gateway 108 and the destination gateways 114 to each other. The third network is the called party's telephone network 106, which completes the connection from the destination gateway 114 to the called party 118. Although FIG. 1 (as well as this description in general) refers to the telephone connections as taking place through public telephone networks 105 and 106, Internet telephony service does not require such a connection. Some applications may use private networks, such as those provided by a private branch exchange; others may simply connect telephone handsets directly to the corresponding gateway.

Additionally, a fourth network may be added to the general network architecture. The fourth network is a banking and funds transfer network 126. A billing and settlement system 124 may be coupled to the service point 112 in order to receive information relating to the financial aspects of the Internet telephony transactions. The billing and settlement system 124 may use a banking and funds transfer network 126 to execute the financial transactions coordinated by the service point 112.

Figure 2:
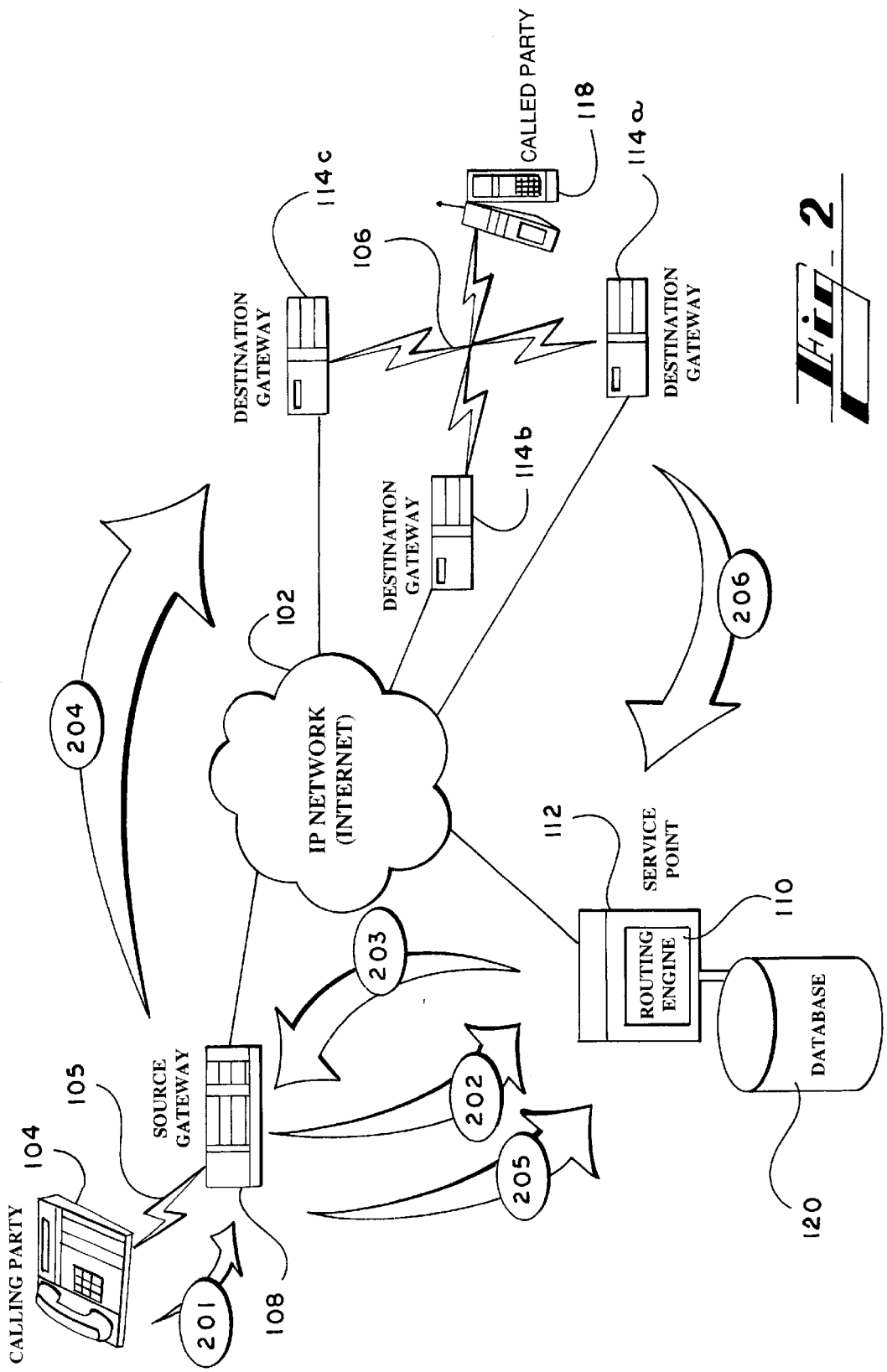
FIG. 2 provides an overview of the steps involved in an Internet telephony call in the exemplary operating environment.

FIG. 2 provides an overview of an Internet telephony call in the exemplary operating environment. At step 201, an Internet telephony call is initiated when the calling party 104 dials a telephone number, which is transmitted to the source gateway 108 for processing. The goal of the source gateway 108 is to locate a destination gateway 114a–c that is able to terminate the phone call. The source gateway 108 relies on the service point 112 for routing assistance.

At step 202, the source gateway 108 makes an authorization request to a service point 112. The authorization request indicates, among other things, the telephone number of the called party 118. At the service point 112, the routing engine 110 uses information in the authorization request, as well as preferences established for the source gateway's 108 cost and quality requirements, to determine which of the destination gateways 114a–c are eligible to complete the call.

At step 203, the service point 112 then sends an authorization response message to the source gateway 108, which includes information relating to the identity of eligible destination gateways 114. In addition, the authorization response message contains an authorization ticket for access to each eligible destination gateway 114. The authorization response ticket allows a destination gateway 114 to accept the call knowing that it has been authorized by the service point 112, and that the service point operator 125 will compensate the destination gateway operator 115 for completing the call.

Upon receipt of the authorization response message, the source gateway 108 selects a destination gateway 114 from among the list provided by the service point 112. At step 204, the originating gateway 108 then sends a setup message to the selected destination gateway 114, as specified in International Telecommunications Union (ITU) H.323 and associated standards. Those skilled in the art will recognize that the Q.931 standard may be used to define the setup message. To complete the authorization, the setup message must include the authorization ticket for the destination gateway 114. Those skilled in the art will also recognize that the user-to-user information element of the Q.931 setup message may be used to convey the authorization ticket.

Communication between the service point 112, the source gateway 108 and the destination gateways 114 does not require the use of standard protocols for any aspect of the Internet telephony calls themselves, including call setup. If the source gateway 108 and destination gateways 114 use a signaling protocol other than Q.931 (which is specified by H.323 and H.225.0), then that protocol need only be capable of including the authorization ticket in the initial setup message. The exemplary authorization ticket is approximately 2000 octets in length. Destination gateways 114a–c may accept or reject Internet telephony calls based on the presence and contents of this authorization ticket.

After the Internet telephony call is completed, both the source gateway 108 and the destination gateway 114 transmit a call detail report to the service point 112, as represented in steps 205 and 206. Call detail reports identify the call and record its duration. Call detail reports are stored in the database 120 and are accessed by the billing and settlement system 124 in order to reconcile financial obligations between the service point operator 125, source gateway operators 109 and destination gateway operators 115.

It should be noted that source gateway 108 and destination gateways 114 are free to establish connections without consulting a service point 112. For example, a group of gateways may all be owned by a common entity and may wish to exchange calls among themselves independent of a service point 112. In such an environment, the gateways are free to rely on a service point 112 only when no gateway in the group can serve a given phone number economically. Thus, the exemplary operating environment provides gateways with extremely flexible routing choices.

Also, those skilled in the art will appreciate that the exemplary operating environment may include multiple service points 112. Service points may be distinguished by the specific services they provide, as well as by their geographic location on the Internet 102. Geographic diversity optimizes performance by allowing a device to communicate with the closest service point 112. Proximity to a service point 112 minimizes delay in the communication exchange. Geographic diversity also increases the reliability of the operating environment. If one service point 112 becomes unavailable, devices using that service point 112 can automatically switch to a different service point (not shown) located elsewhere.

Before a gateway is provided with access to a service point 112 the responsible gateway operator must enroll as a customer of the service point operator 125. The customer enrollment process may take place through the web-site 122, via the Internet 102, using any well-known web browser. Gateway operators 109 & 115 typically perform the enrollment from a desktop computer. Since the enrollment process typically requires disclosure of sensitive financial information (such as bank accounts or credit card numbers), the web connection between the gateway operators 109 & 115 and the web-site 122 is secured by the secure sockets layer (SSL) protocol. The web-site 122 uses SSL to authenticate itself to gateway operators 109 & 115 with digital certificates obtained from a trusted certificate authority. SSL also encrypts the information transferred between the gateway operators 109 & 115 and the web-site 122.

When the service point operator 125 accepts a gateway operator as a customer, it provides the customer with a customer number and password. The customer number is Hamming coded to protect against corruption. Once assigned, customers are allowed to change their password. The service point operator 125 may enforce certain restrictions on passwords to maximize security. Such restrictions may include, for example, a prohibition against words appearing in dictionaries, a requirement to use both upper and lower case characters and a requirement that customers change their password periodically.

After enrollment is complete, gateway operators 109 & 115 are given authorization to access and modify their accounts, via the Internet 102, through the web-site 122. Enrolled customers may also be provided with access to timely and informative reports on their usage of a service point 112. Such reports may include up-to-the-minute billing information, potential fraud alerts, sophisticated usage statistics and detailed traffic profiles. Enrolled users may access these reports directly through the web-site 122, using a web browser, or they can download the information for importing into their own database or spreadsheet. Users may also elect to be notified via electronic mail, fax, or other means when certain events occur. Events eligible for this service include suspicious or fraudulent activity, minimum or maximum traffic levels at particular devices, and apparent failure of a device.

An enrolled customer may activate individual devices to use the services provided by a service point 112. In the present discussion, the exemplary devices are Internet telephony gateways 108 & 114. However, those skilled in the art will appreciate that the exemplary operating environment may be configured to supports a wide variety of devices. As with operator enrollment, device activation takes place across the Internet 102 using well-known web browsers. Typically, device activation will take place at the device itself, while operator enrollment is performed from an operator's personal computer or workstation.

A web-site 122 may be configured to support several different approaches for activating devices, depending on the particular type of device. In all cases, though, a device becomes activate through a three-step process. First the device generates a public/private key pair and stores the private key securely. Next the device forwards the public key to the web-site 122 through a certificate request. Last, the web-site 122 provides a certificate to the device validating the public key. The detailed implementation of this three-step device activation process varies depending on the operating environment of a particular device. A web-site 122 may be configured to support Windows, UNIX, and embedded operating environments. Those skilled in the art will recognize that other operating systems may also be supported.

With respect to the Windows operating environment, exemplary web-site 122 may be designed to support the operating environments of Windows 95, Windows 98 and Windows NT version 4.0 and later (collectively referred to as "Win32 platforms"). For these operating environments, reliance may be placed heavily on Microsoft's Internet Explorer (version 3.02 and later) to generate key pairs and to request and install certificates. The Certificate Server component of Microsoft's Internet Information Server version 4.0 may be used to grant certificate requests.

Figure 3:
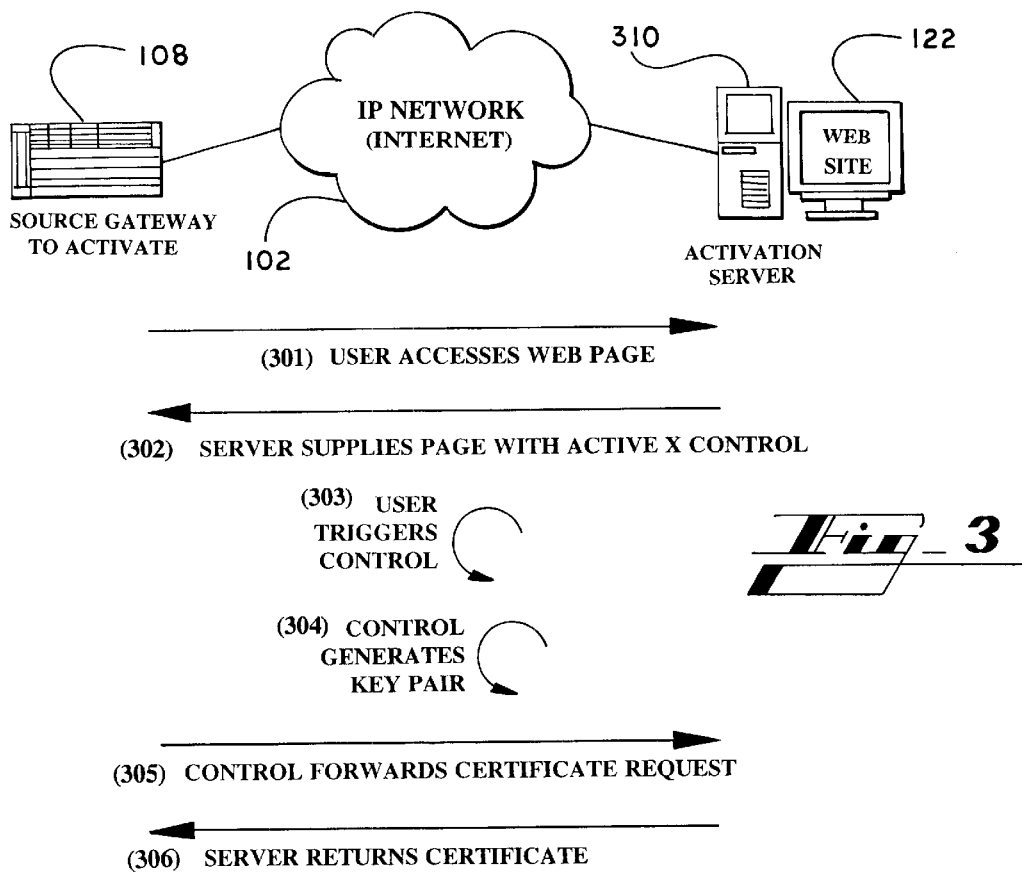
FIG. 3 provides an example of the device activation process for a device running the Win32 platforms.

FIG. 3, shows an example of the activation process for a device running the Win32 platforms. The two systems involved in the communication are the device being activated, i.e. source gateway 108, and an activation server 310 (also known as a certificate server) running as part of the web site 122. As indicated at step 301, the user of the source gateway 108 must first navigate to the appropriate part of the web site 122, such as a device activation page. Users may be prompted to provide authentication information to access a device activation page. In addition to HTML-formatted instructions, the device activation page downloads an ActiveX control, as shown as step 302. This control is digitally-signed by a trusted object-signing authority. When triggered by appropriate user interaction with the HTML form at step 303, the control causes the device to generate a public/private key pair at step 304, build a certificate request and forward that request at step 305 to the activation server 310.

The ActiveX control relies on the version 2.0 of the Crypto API interface, available on Win32 platforms, for cryptographic algorithms and certificate management. Optimally, the control will use the strongest cryptographic algorithms available on the platform. For example, if the source gateway 108 has installed Microsoft's enhanced cryptographic service provider, then the control will use its cryptographic services. In the absence of other services, the control will use Microsoft's base cryptographic service provider. If no cryptographic services are available in the device, device activation is not possible.

Certificate requests follow the format defined by RSA laboratories in Public Key Cryptography Standard (PKCS) number 10. At step 306, the activation server grants the request and returns a certificate for the device (source gateway 108). The certificate conforms to the International Telecommunication Union X.509 version 3 standard.

Optimally, certificates issued by the activation server 310 will include the "subjectAltName" extension, marked as critical. That extension encodes both the customer and device number in ASCII text. The exemplary format for the data is "Customer=nnnnnnn, Device=mmmmmm" where nnnnnnn is the customer number and mmmmmm is the device number. Device numbers, like customer numbers, are generated by the service point operator 125 and are Hamming coded to protect against corruption.

Figure 4:
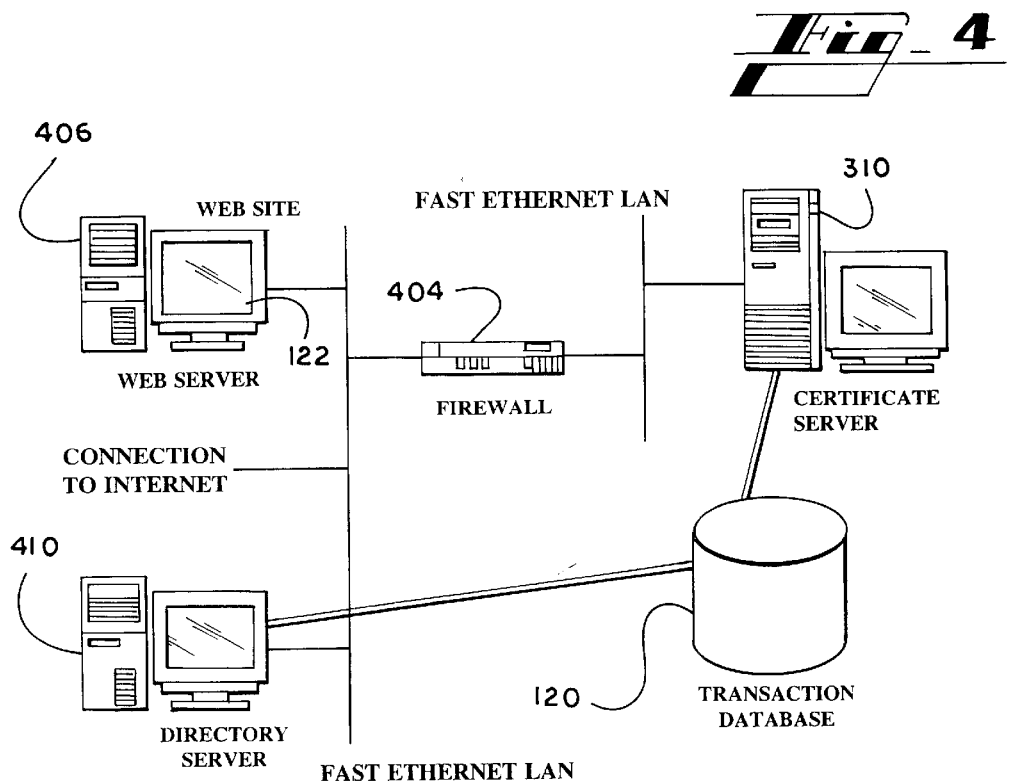
FIG. 4 provides a detailed picture of an exemplary activation server as a part of the exemplary operating environment.

Although shown in FIG. 3 as a single system, the activation server 310 may actually consist of multiple components. FIG. 4 provides a more detailed picture of an exemplary activation server 310. Note that the actual activation server 310 is isolated from the Internet 102 by a firewall 404. Web servers 406 outside the firewall provide the web-site 122, but these web servers 406 must contact the activation server 310 through the firewall 404 to generate certificates. The activation server 310 stores copies of the certificates in a Open Database Connectivity (ODBC) accessible database 120. The database 120 can redistribute certificates and certificate revocation lists (CRLs) to a service point 112 (where they are used to authenticate devices and authorize communications) as well as to public LDAP-compliant directories 410. The public directories let customers of the service point operator 125 use certificates for additional security services such as gateway-to-gateway authentication and encryption.

UNIX-based devices cannot, in general, rely on the services of ActiveX controls and Internet Explorer for device activation. Instead, as shown in FIG. 5, at step 501, such devices must download binary software from the web site 122. Such software may be optimized for several popular UNIX variants. To prevent unauthorized use of the software, the user's customer number, a generated device number, and a relatively short time limit (for example 15 minutes) are added to the software just prior to download at step 502. The software is then digitally signed at step 503 and distributed to the Unix-based device (gateway) at step 504. The precautions taken in the distribution of activation software effectively make the software a single-use program. Thus, the activation software cannot be re-distributed and used on other devices.

As an example, the activation software may include cryptographic software from RSA laboratories. In particular, the BSAFE 3.0 for cryptographic algorithms and BCERT 1.0 for certificate management software programs may be used. The activation server 310 may also be configured to automatically verify the physical location of a device with reverse Domain Name Service (DNS) and "who is" lookups. In cases where it is not possible to provide cryptographic software at all, for example due to import restrictions, device activation is not possible. Once downloaded, however, the activation program generates a key pair, formats a certificate request, and forwards that request to the activation server. The same activation server 310 may support both Windows and UNIX devices.

The web-site 122 may also be configured to support devices using embedded operating systems such as Cisco's Internetwork Operating System (IOS), WindRiver's VxWorks and others. To the extent that an embedded operating system can support standard UNIX services, it may use the approach outlined above for UNIX environments. Rather than supply downloadable binary programs for embedded environments, the web-site 122 may provide source code licenses to vendors using embedded environments. The method for embedding customer number and device number in that software may be defined on a case-by-case basis with each vendor.

Once enrolled customers have activated their devices (gateways), the devices can begin using the service to help complete their Internet telephony transactions. As mentioned, an Internet telephony transaction is initiated when a calling party 104 dials the telephone number of a called party 118. The dialed telephone number is transmitted to the source gateway 108 for processing. The source gateway 108 must then locate a service point 112 that will provide routing assistance for the telephone call. As noted previously, several services points 112 may be connected to the Internet 102 to provided geographic diversity.

In the exemplary operating environment, service points 112 share a primary DNS name (such as "routing.transnexus.com.") Thus, source gateway 108 or other device may locate a service point 112 by simply attempting to communicate with the appropriately named system. Using DNS names allows for the use of technology such as Cisco's Distributed Director. When a source gateway 108 or other device requests a DNS lookup of a particular name, the Director automatically supplies the IP address of the service point 112 nearest the requesting device. By communicating with the nearest service point 112, devices experience the minimum delay in accessing a service point 112. In case the Distributed Director technology is unavailable, devices may also be configured with a list of specific names for individual service points 112.

Specific names for individual service points may be of the form "us.routing.transnexus.com," "routing.transnexus.co.uk," and "routing.transnexus.cojp," where one component of the name indicates the service point's 112 location. Devices (gateways) should also be manually configured with their own current location, so that they can prioritize eligible service points 112 by proximity. A device can then try to contact each service point 112, in turn, until communication is successful.

Once the source gateway 108 finds a service point 112, it may access the services provided by the service point 112. Service points 112 allow at least three forms of access. Hypertext Transfer Protocol (HTTP) is available for all types of service. Voice and fax services have two additional options, namely gatekeeper access and gatekeeper-routing. Service point access may be accomplished in the manner described in U.S. application Ser. No. 09/154,566, entitled "Gatekeeper for Internet Clearinghouse Communications System" filed on Sep. 16, 1998 and owned by the assignee for the present application. This related application, U.S. application Ser. No. 09/154,566, is hereby fully incorporated herein by reference.

When any device attempts to contact a service point 112, using either HTTP or H.323 protocols, the service point 112 authenticates that device before providing service. Authentication relies on public key cryptography, most specifically the public/private key created during device activation, as described above. All messages from devices are digitally signed, using the device's private key. The message may also include a certificate validating the device's public key. A service point 112 obtains the device's public key, either from the included certificate (in which case it then verifies the certificate's signature), or directly from a certificate store. The public key permits verification of the signature.

The exemplary service point 112 architecture provides for flexible and scalable authentication services. As FIG. 6 shows, each service point 112 consists of a number of authentication servers 602. The authentication servers 602 are protected by a screening firewall 604, while a local redirector 606 provides load balancing and fault tolerance among the authentication servers 602. All service points 112 preferably include at least two authentication servers 602 for fault tolerance, but can support many additional authentication servers 602 as load demands. FIG. 6 shows authentication servers 602 as standalone systems for clarity. However, those skilled in the art will recognize that actual implementation may involve rack-mounted components with a shared keyboard and monitor.

Authentication servers 602 may use the Windows NT operating system and the cryptographic services available in version 4.0 (SP3) and later. Authentication servers 602 are capable of software-based cryptographic services, but can be upgraded to hardware-based encryption technology as load demands. For devices that support multiple end users, such as Internet Telephony gateways 108 & 114, authentication servers 602 may also be configured to support end-user level authentication. End-user identification and authentication (such as calling card and PIN numbers) may be included with each service request. Although optional, the end-user identification allows a service point 112 provide several enhanced services to its customers. Enhanced services may include sophisticated fraud control, end-user billing, and roaming services.

Once a service point 112 has authenticated a device (gateway), it can provide routing services for that device. In the exemplary operating environment, routing services may rely on special purpose routing engines 110, which will be described in detail below. Since routing information is often sensitive data, routing engines 110 within a service point 112 are protected by an additional firewall 610. As with authentication servers 602, an exemplary service point 112 includes multiple routing engines 110 for scalability and fault tolerance. FIG. 6 shows how routing engines 110 connect to the service point 112 infrastructure. Again, routing engines shown as standalone systems for clarity may typically be implemented as rack-mounted components. Routing engines 110 preferably run routing software on high-performance UNIX servers. In the exemplary operating environment, each routing engine 110 operates autonomously, independent of other routing engines 110 in the service point 112.

FIG. 7 illustrates the overall message flow within a service point 112. At step 701, an incoming authorization request message is filtered by the screening firewall 604 and passed to the web redirector 606. At step 702, the web redirector passes the message to an available authentication server 602. As shown in step 703, once an authentication server 602 validates a request, it passes the request through the main firewall 610 to a routing engine 110. The routing engine 110 processes the request and returns a response to an authentication server 602 at step 704. Routing engines 110 also accept detail reports from authentication servers 602. Routing engines 110 forward transaction details, including the digitally-signed requests and detail reports to the database 120, which may later be accessed by the billing and settlement system 124. Most service points 112 use a virtual private network (VPN) link through the main firewall 610 for communication to the database 120.

Once a routing engine 110 returns route information, the authentication server 602 adds authorization information to the response before returning it to the requesting device (gateway). Step 705, in which the authentication server 602 responds to the requesting device, is the point at which authorization is added. When the routing engine 110 returns multiple eligible devices that can terminate the request, separate authorization information is created for each eligible device. This is true whether the devices are to be used simultaneously (such as in a multi-point conference) or serially (in case the first choice is unavailable, for example). The originating device (source gateway 108) must present the appropriate authorization information to a terminating device (destination gateway 114) during call setup.

Authorization information consists of several pieces of information subjected to appropriate cryptographic transformations. The exact information depends on the particular service, but, in general, comprises: (1) sufficient information to uniquely identify the call, which may include the called and calling numbers, network addresses of the originating and terminating devices, unique identifiers such as call reference values and so on; (2) the transaction identifier, modified as necessary for terminating devices (for point-to-point services, for example, transaction IDs for terminating devices are changed from even to odd and their Hamming code is regenerated). Since terminating devices must include a transaction ID in detail reports, including a transaction ID in the authorization information forces the terminating device to examine that information and increases the likelihood that it will thoroughly check the information; (3) a valid time and an expiration time which limit the duration of call setup to help prevent inappropriate re-use of authorization information; and (4) a random value to be combined with the valid and expiration times for eliminating the probability of inappropriate reuse of authorization information. Terminating devices, upon accepting a call, are required to store this random number until the expiration time has passed. After the expiration time has passed, a terminating device must reject any setup request that includes the same random number. Authorization information may also include a maximum call duration, which limits the duration of calls that a device is willing to authorize. Authorization information may be encrypted using the public key of the terminating device and may be digitally signed by the service point 112. The encryption prevents originating devices from modifying its contents, and the digital signature lets the terminating device verify that the information did come from the service point 112.

The quality of the ultimate communication between originating and terminating devices is important. Round trip delay, for example, is a critical factor in the quality of voice phone calls. The service point operator 125 is able to estimate the communications quality to different terminating devices and use those estimates to rate each possible route. Some of the models used to estimate quality depend heavily on the specific service. Audio codecs, for example, may have a significant effect on voice quality. Some quality measures, however, apply generally to many services accessed over the Internet 102. Those skilled in art will recognize that service quality monitoring may be accomplished by a separate system (not shown) connected to the Internet 102 and maintained by the service point operator 125. Additionally, the mechanisms for performing service quality monitoring may be incorporated into a service point 112, or any other system maintained by the service point operator 125. Also, a source gateway 108 or a destination gateway 114 may independently perform the tasks of service quality monitoring. A service point operator 125 may provide service quality monitoring software to assist the source and/or destination gateway operator.

One measure of quality between two devices is the length of the network path between them. The length of the network path can be modeled by calculating the number of autonomous systems (AS) in the path between the two devices. To obtain the information needed to perform this calculation, software may be developed to establish Border Gateway Protocol (BGP4) peering relationships with BGP neighbors in other autonomous systems. From these peering sessions, a path may be determined, defined in terms of autonomous systems, from any peered AS to any other AS. To calculate exact paths, a service point operator 125 must peer with every transit AS that is a neighbor of an AS containing customer of the service point operator 125. It is not necessary to peer with the customer's autonomous systems directly. In the absence of complete AS connectivity, the service point operator may estimate the distance between AS from partial information.

In some cases the difference in router hops between an originating device and multiple potential terminating devices may be estimated. To do so, a service point operator may use the "traceroute" command to calculate hop counts from a service point 112 or other central point to each device (gateway). Though this information does not provide an absolute hop count between the originating gateway 108 and terminating gateways 114, the relative difference may be used to estimate the relative difference the originating gateway 108 would experience.

In a manner similar to relative hop counts, a service point operator 125 can also estimate relative differences in round trip delay. Instead of "traceroute," the service point operator may use UDP echo probes to measure round trip delays from a service point 112 or other central location. The difference in delays between two potential destination gateways 114 serves as an estimate of the delay difference an source gateway 108 would experience between the same two destination gateways 114.

Another approach that a service point operator 125 may use to model expected service quality is extrapolation from historical data. Along with billing information, a service point operator 125 may collect quality measurements as part of detail reports. Traditional statistical techniques adapted for the Internet environment can then be used to project future service quality.

In an exemplary embodiment, the service point operator 125 may maintain a system for monitoring the service quality to all gateways participating in the service. The service point operator 125 may allow gateway operators to specify a premium they are willing to pay for improved service quality. The service point provider 125 may then program the service point 112 to route calls to gateways offering improved quality, as long as the rates charged fall within the originators' willingness to pay. If gateway operators are willing to make investments to improve their service quality, this approach lets them recover the cost of those investments through higher rates. Note that the service point operator 125 itself will likely not set rates or service quality standards. The concept of the service point 112 is to provide a market-based service that allows gateway operators the flexibility to set their own rates and establish their own service quality strictly according to market requirements.

The service point operator 125 may rely on two key parameters to determine Internet service quality: (1) delay and (2) packet loss. Although other factors can have a significant influence on users' perceptions of quality, these two parameters represent the most direct measures of the Internet's contribution to quality.

Round trip delay between the service point 112 and each gateway may be measured. The delay may be recorded in milliseconds with an accuracy of approximately 5 milliseconds. At each measurement, the paths used for the request and response messages are the normal forwarding paths employed by routers between the service point 112 and the gateways. Bi-directional packet loss between the service point 112 and each gateway may also be measured. Loss may be recorded as a percentage, where, for example, a measurement of 10% indicates that 1 out of 10 packets transmitted did not reach its destination.

In collecting the data for delay and packet loss, the service point operator 125 simulates the environment of an H.323-compliant voice call as closely as possible. The collection techniques are also structured to maximize the statistical relevance of the measurements. To probe both delay and loss, the service point operator 125 may send echo messages to the gateways and measures the resulting responses. To more closely simulate voice traffic, UDP echo messages with 256 octets of user data may be used. These messages may be directed to UDP port 7 on the destination gateway. If no responses are returned, the service point operator 125 may assume that UDP echo service is not available on the gateway in question, and it may retry the measurement using ICMP Echo Requests (pings), also with 256 octets of user data.

Since ICMP messages are often subject to special processing in routers and hosts, ICMP measurements are likely to indicate greater delay than UDP messages. For this reason, the service point operator 125 may encourage all gateway operators to enable UDP echo service on their gateways. The service point operator 125 may choose to make no adjustments to measurements obtained via ICMP Echo exchanges, but rather may compare them directly to other measurements made through UDP.

For each measurement block, the service point operator generates a steady stream of UDP or ICMP traffic at an exemplary rate of 3 packets per second. This stream roughly simulates the talk interval of a G.723A codec commonly used for H.323-compliant gateways. Each block may be measured for bi-directional packet loss and average round-trip delay. Both to avoid self-synchronization effects, and to minimize statistical bias, delay nd loss measurements may be made according to a Poisson distribution. Both the interval between measurement blocks and the length of each block are random values that follow an exponential distribution. Adjustment may be made to the mean of these distributions to obtain the best balance between network loading and measurement reliability. Those skilled in the art will appreciate that the practice of conducting measurements at exponential intervals, is not meant to imply that voice traffic (or, indeed, any Internet traffic) may be modeled by a Poisson process. The choice of exponentially distributed intervals is intended purely to minimize time bias in the measurements, not to mimic traffic patterns.

To calculate a single number for delay and loss for each gateway, straightforward statistical processing may be used. In particular, measurements may be retained for one week, and a percentile ranking within the retained values may be relied upon. The retained data set may be updated (by discarding old data and adding new measurements) each day at 0:00 hours UTC. When a gateway first joins the service, no service quality measurements will be available until 0:00 UTC on its second day of operation. Until a full week has passed, the service point operator 125 will rely on the available data for quality determination. As a single, representative value for both delay and loss, the service point operator 125 may use the $80^{th}$ percentile for each measurement, over the most recent one week interval.

At the billing and settlement system 124, a service point operator 125 provides net settlement and billing services for its customers. The billing and settlement system 124 may be located at central and secured facilities. Service points 112 periodically update the billing and settlement system 124 with detail reports received from devices (gateways). The billing and settlement system reconciles the different reports from each device involved in a single communications transaction and calculates the net settlement funds to be paid to or collected from each customer. The service point operator 125 may execute the actual monetary transactions though traditional financial networks 126 at various financial institutions 128.

Exemplary Routing Engine

As described above, a service point 112 in the exemplary operating environment includes a routing engine 110 that is responsible for providing routing information to a source gateway 108. The exemplary routing engine 110 is particularly useful in situations where a source gateway 108 is provided with the identity of the called party 118 (i.e. the called telephone number), but is not provided with the address of an appropriate destination gateway 114. Use of the exemplary routing engine 110 is even more appropriate in situations where there are more than one eligible destinations gateway 114a–c. The exemplary routing engine 110 has the ability to determine the network addresses of all eligible destination gateways 114a–c and then prioritize the eligible destination gateways 114a–c. As mentioned, the exemplary routing engine 110 provides the prioritized list of destination gateways 114a–c to the source gateway 108. The source gateway 108 then attempts to setup a call with the first-listed destination gateway 114. If the first-listed destination gateway 114 does not accept the call, for any reason, the originating gateway 108 attempts to setup a call with the next-listed destination gateway 114. The source gateway continues to attempt to setup the call with each successive next-listed destination gateway 114 until the call is established.

Prioritization of eligible destination gateways 114 by the exemplary routing engine 110 is based on (1) preferences established by a source gateway operator 109, (2) monetary value charged by a destination gateway operator 115 for access to a destination gateway 114 and (3) network environment conditions. The exemplary routing engine 110 provides maximum flexibility in routing choices by allowing source gateways operators 109 to set their own preferences and destination gateways operators 115 to set their own costs. Network environment conditions may be evaluated for the routing engine by a separate system, as described above in connection with service quality monitoring. Preferences, costs and network environment conditions are stored in a database 120 and this information is periodically accessed by the routing engine 110.

A source gateway operator 109 may upload information to the database 120 via a web-site 122, or via any other electronic transfer means. The web site 122 may be accessed via any commonly known web browser. The web site 122 may contain a form to be populated by the source gateway operator 109. Those skilled in the art will recognize that no particular user interface (UI) for the web site 122 is required, however, the UI should be as user friendly as possible.

The preferences defined by the source gateway operator 109 relate to monetary cost, delay and reliability. The routing engine 110 uses the preferences set by the source gateway operator 109 as filters for eliminating potential destination gateways and determining determine the best destination gateway to terminate a called number. The source gateway operator 109 may specify none or any combination of preferences as its filters. Also, service point operator 125 and source gateway operator 109 may specify the maximum number of call routes that will be returned in response to each call authorization request. The routing engine 110 may be programmed to respond with whichever maximum number is less.

In the exemplary embodiment, a first preference is defined as "the maximum amount the source gateway operator 109 is willing to pay for a call to a specific dial string." All destination gateways charging rates that are greater than the maximum price are eliminated from the search for the optimal call route. The maximum price criteria may be specified as a function of time of day and day of the week. This maximum amount may be expressed in any type of currency and any fraction thereof.

Another preference in the exemplary embodiment may be defined as "the maximum delay a source gateway operator 109 is willing to tolerate." The maximum delay is preferably the overall network delay, which is measured by the time taken for a signal to travel between the calling party 104 and the called party 118. The lower the network delay from when the calling party 104 speaks to when the called party 118 hears the words, the higher the quality of the conversation. Those skilled in the art will appreciate that there are many other factors that determine delay or latency in a voice telephone call. Other examples of delay include: delay due to interlocking of a digital conversation, buffering delays inside gateways, delays on public switched telephone networks (PSTN), etc. It is contemplated that the such other sources of delay may be factored into the "maximum delay preference." However, it is expected that network delay will be the most significant contributor to the overall quality of an Internet telephony call. Thus, in the exemplary embodiment, other sources of delay are ignored.

Another preference defined in the exemplary embodiment is the "maximum autonomous system (AS) hop count that the source gateway operator will tolerate." The Internet 102 comprises a collection of "autonomous" IP networks. Thus, a voice signal traveling from a source gateway 108 to a destination gateway 114 may traverse one or more autonomous systems. The fewer autonomous systems that a signal must traverse, the lower the network delay should be. While it is not necessarily true that a lower AS hop count will lead to lower delay, AS hop count does provide a good estimation of network delay. Furthermore, a lower AS hop count tends to suggest that there will be less signal loss (packet loss) when the voice signal reaches its destination.

A determination of AS hop count is instantaneous and may be derived from information relating to the dynamic topology of the Internet 102, which is dictated by congestion, etc., that is continuously gathered and stored in the database 120. To the contrary, network delay may only be determined by actual measurement, as described above, which involves significantly more time than an AS hop count calculation. Therefore, a source gateway operator 109 may elect to use the AS hop count preference, rather than the "maximum delay" preference.

An additional preference may be defined as "autonomous system (AS) matching," which dictates that, whenever possible, a route should be chosen such that both the source gateway 108 and the destination gateway 114 are on the same AS. A determination of AS matching is similar to a determination of AS hop count. A determination of AS matching dictates that given the choice of an AS hop count of zero and any other AS hop count, the route having the AS hop count of zero will be chosen. Similarly, "domain matching" and "platform matching" preferences may be defined, such that no destination gateway 114 that operates in a specified domain or on a specified platform will be selected to terminate a call.

Of course, a source gateway operator 109 may set as many or as few preferences as it would like. It is contemplated that preferences other than the exemplary preferences described herein may be implemented. For example, the source gateway operator 109 may also set preferences defining that all destination gateways 114 that are not interoperable with the source gateway 108 or do not offer the requested type of service, i.e. voice or fax, are to be eliminated from consideration. Other preferences may include, but are not limited to: "historical availability," which eliminates from consideration all destination gateways 114 that have historical availability less than the required availability specified by the source gateway operator 109; "preferred operator," which eliminates from consideration all destination gateways 114 that are not operated by a preferred operator specified by the source gateway operator 109; "packet loss," which eliminates from consideration all destination gateways 114 whose historical packet loss is greater than the minimum specified by the source gateway operator 109; "latency," which eliminates from consideration all destination gateways 114 whose historical packet loss is greater than the maximum latency specified by the source gateway operator 109; "quality of service (QoS) score," which eliminates from consideration all destination gateways 114 whose QoS is less than the minimum specified by the source gateway operator 109; "RSVP preference," which eliminates from consideration all destination gateways 114 that cannot support, or are on networks that do not support, bandwidth reservation; and "best worst case," which eliminates from consideration all destination gateways 114 whose best worst case scenario for packet loss and latency exceeds the minimum best worst case scenario specified by the source gateway operator 109. The best worst case is estimated by sumnming the packet loss or latency between the source gateway 109 and a reference point maintained by the service point operator 125 ($SP_{ref}$) plus the latency and packet loss between the destination gateway 114 and $SP_{ref}$. For example, the worst case for packet latency between a source gateway 109 and a destination gateway 114 is assumed to be equal to packet latency between the source gateway 109 and $SP_{ref}$+ destination gateway and $SP_{ref}$.

Preferences may also be ranked by the source gateway operator 109, such that one type of preference is given more weight by the routing engine 110 when eligible destination gateways are prioritized. A predetermined system for ranking preferences is useful when the routing engine 110 locates more than one destination gateway 114 that satisfies all preferences. Thus, a ranking system may be used as a "tie breaker." A source gateway operator 109 may prioritize its preferences in any order, or no order at all.

Preferences may be ranked by least cost. By way of example, a preference designated by a source gateway operator 109 may dictate that the maximum price the source gateway operator 109 is willing to pay for a call to London is $0.40/minute. The routing engine 110 may locate two eligible destination gateways 114a–b to terminate the call; one destination gateway 114a charging $0.35/minute and the other destination gateway 114b charging $0.30/minute. Both destination gateways 114a–b are eligible because they each meet the preference designated by the source gateway operator 109. However, the source gateway operator 109 may also specify that all eligible destination gateways 114a–b are to be ranked (or sorted) by least cost. Thus, the destination gateway 114b charging $0.30/minute will be assigned a higher priority than the destination gateway 114a charging $0.35/minute.

Preferences may also be ranked by AS matching, such that priority is given to routes involving gateways on the same autonomous system. Also, preferences may be ranked by subscriber (intra-domain) matching, such that priority is given to routes involving destination gateways 114 connected to the same network as the source gateway 109. Intra-domain routing may be predefined to take first priority even if price and quality of service are inferior to other gateways.

Preferred platform matching allows a source gateway operator 109 to prioritize its preferred destination gateway platform for termination. For example, Lucent and VocalTec gateways may be interoperable; however, a source gateway operator 109 who has deployed Lucent gateways might prioritize that calls be routed to Lucent gateways as a first choice. Or the source gateway operator 109 might specify that VocalTec gateways be eliminated as a possible destination gateways, even though they are compatible and are the best match for the source gateway operator's 109 other routing criteria.

Preferences may also be ranked based on minimum AS hop count. Priority may be given to BGP query route calls to destination gateways 114 that can be reached with the fewest autonomous system hops. Preferences may also be ranked based on historical records of availability (as a function of day of week and time of day). Priority may thus be given to destination gateways 114 with the best historical availability or eliminate those gateways with historical availability less than the minimum required by the source gateway operator 109. Further, to support. implementation of bilateral agreements, a service point operator 125 may allow source gateway operators 109 to prioritize their preferred destination gateway operators 115 for termination. For example, source gateway 109 may specify that destination gateway operator 115b is always its first choice for termination and destination gateway operator 115c is its second choice for termination even if other terminating gateways are a better fit for the source gateways operator's 109 routing criteria. Similarly, a source gateway operator 109 may prioritize specific individual destination gateways as its preferred termination point for a call to a dialed number string.

Based on historical records of packet loss between the source gateway 109 and potential destination gateways 114 (possibly as a function of day of week and time of day), priority may be assigned based on lowest historical packet loss. In a similar manner, priority of routing may be assigned based on the lowest historical packet latency between the source gateway 109 and potential destination gateways 114 (possibly as a function of day of week and time of day). Further, ranking of potential destination gateways 114 may be based on other preference, such as: QoS scoring, by using historical data of packet loss, latency and availability with codec and gateway implementation choices to make best destination gateway 114 selection; RSVP, by routing calls based on which call path offers the required bandwidth reservation at the lowest price; and "best worst case," by routing calls based on the best worst case scenario described above. In the absence of any ranking or sorting scheme specified by a source gateway operator 109, the routing engine 110 may either employ its own ranking scheme, or in the interest of impartiality, randomly prioritize the eligible destination gateways 114.

When setting preferences, the source gateway operator 109 may also provide the routing engine 110 with "preference criteria," which define the circumstances in which a given preference or set of preferences are to apply. For example, the source gateway operator 109 may specify a called number prefix to which a certain preference is to apply. Accordingly, all calls placed to the specified called number prefix are to be routed based upon the corresponding preferences. In the exemplary embodiment, a called number prefix is defined by ITU standard E.164. An exemplary called number may be "+1 404 567 8910." According to E.164, the components of the exemplary called number may be defined as follows: "+" designates an international call; "1" is the country code for the United States; "404" is the national destination code, also known as the area code in the United States; "567" is the local exchange; and "8910" is the identifier of the actual telephone line.

The source gateway operator 109 may designate any portion of the called number as the called number prefix. By way of illustration, the called number prefix "+1" signifies that a certain preference is to be applied to all calls to/from the United States. A called number prefix of "+1404" signifies that a certain preference s to be applied to all calls to/from Atlanta. Similarly, if it is known that corporation X utilizes all telephone numbers between +1.404.567.8910 and +1.404.567.8919, the called number prefix may be designated as +1404567891, which will cause a certain preference to be applied to all calls to/from corporation X. As can be seen, the called number prefix may comprise any portion of the called number and is not limited to any particular division thereof.

In addition to called number prefixes, a preference criteria may include the identity of a specific source gateway 108. As mentioned previously, a source gateway operator 109 may own and/or operator many source gateways 108. The source gateway operator 109 may desire that different preferences apply to calls handled by different source gateways 108. Other preference criteria may include specifications of the time of day and/or the day of the week. A time of day preference criteria may be specified down to the second (or any fraction thereof), if desired. An effective date may also be specified as a preference criteria. An effective date allows a source gateway operator 109 to specify that certain preferences are to be considered for routing from a given point in time.

Routing decisions made by exemplary routing engine 110 are also based on preferences set by destination gateway operators 115. In the exemplary embodiment, destination gateways operators 115 set only one preference. The preference set by a destination gateway operator 115 is the monetary charge for access to a destination gateway 114. A destination gateway operator 115 is typically not concerned with delay, packet loss, or other factors that may be of concern to source gateway operator 109. Once a network packet containing a voice signal arrives at a destination gateway 114, the packet is routed to the appropriate called party 118, regardless of the amount of delay or packet loss associated therewith. Like the originating gateway operator 109, the destination gateway operator 115 may designate certain preference criteria. Such preference criteria allow the destination gateway operator 115 to define the circumstances in which its preferences, i.e., cost schedule, will apply. Preference criteria may relate to a specific destination gateway 114, a called number prefix, a time of day, a day of the week, an effective date, etc.

Figures 8, 10:
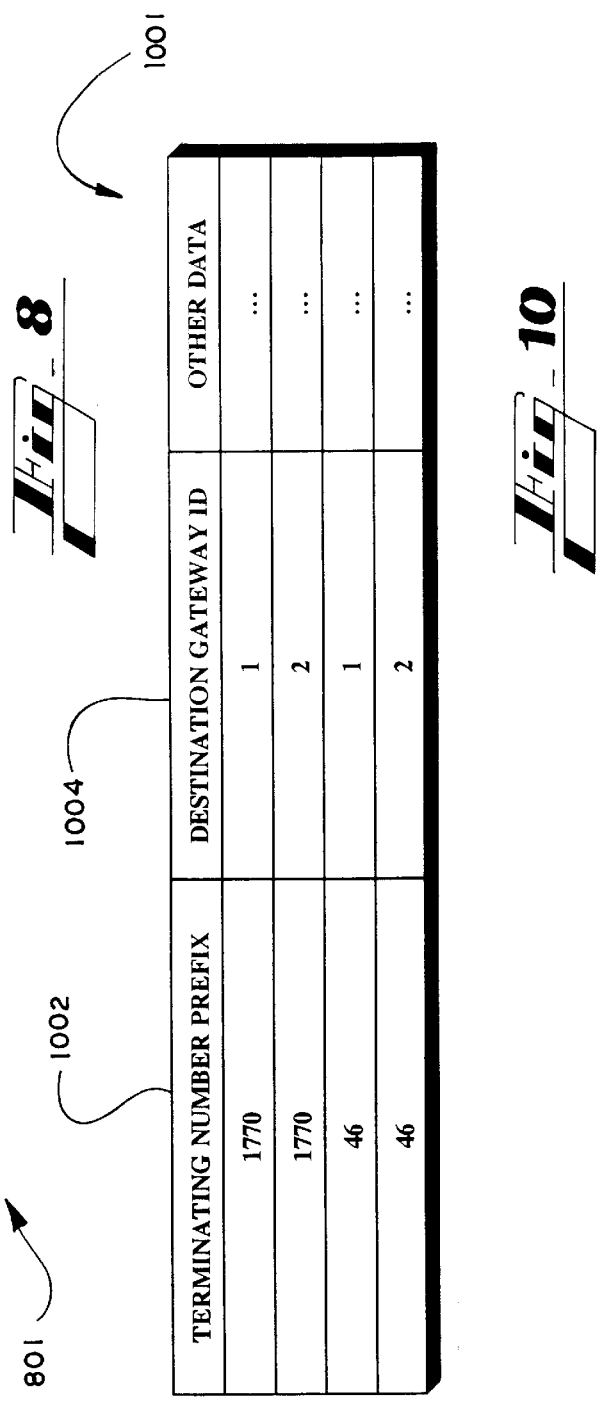
FIG. 8 illustrates an exemplary database table for storing information relating to a source gateway.
FIG. 10 illustrates an exemplary database table for storing information relating to a destination gateway.

All preferences and preference criteria set by the source gateway operator 109 and the destination gateway operators 114 are stored in the database 120. FIG. 8 illustrates an exemplary database table 801 for storing information relating to a source gateway 108. In an exemplary embodiment, database tables 801 may be sorted first by gateway identification number 802 and then by called number prefix 804, effective date 806 (in descending order), start day 808 and start hour 810. Sorting data in the described manner is not required, but is recommended for improved performance. A routing engine 110 may be required to process a significant amount of routing requests in a short period of time. Thus, the database table 801 should be organized in an easily searchable manner. The ultimate goal of the routing engine 110 is to access the database table 801 to determine the preferences for a source gateway 108, such as the maximum price 820 that the source gateway 108 is willing to pay for an Internet telephony call.

Figure 9A:
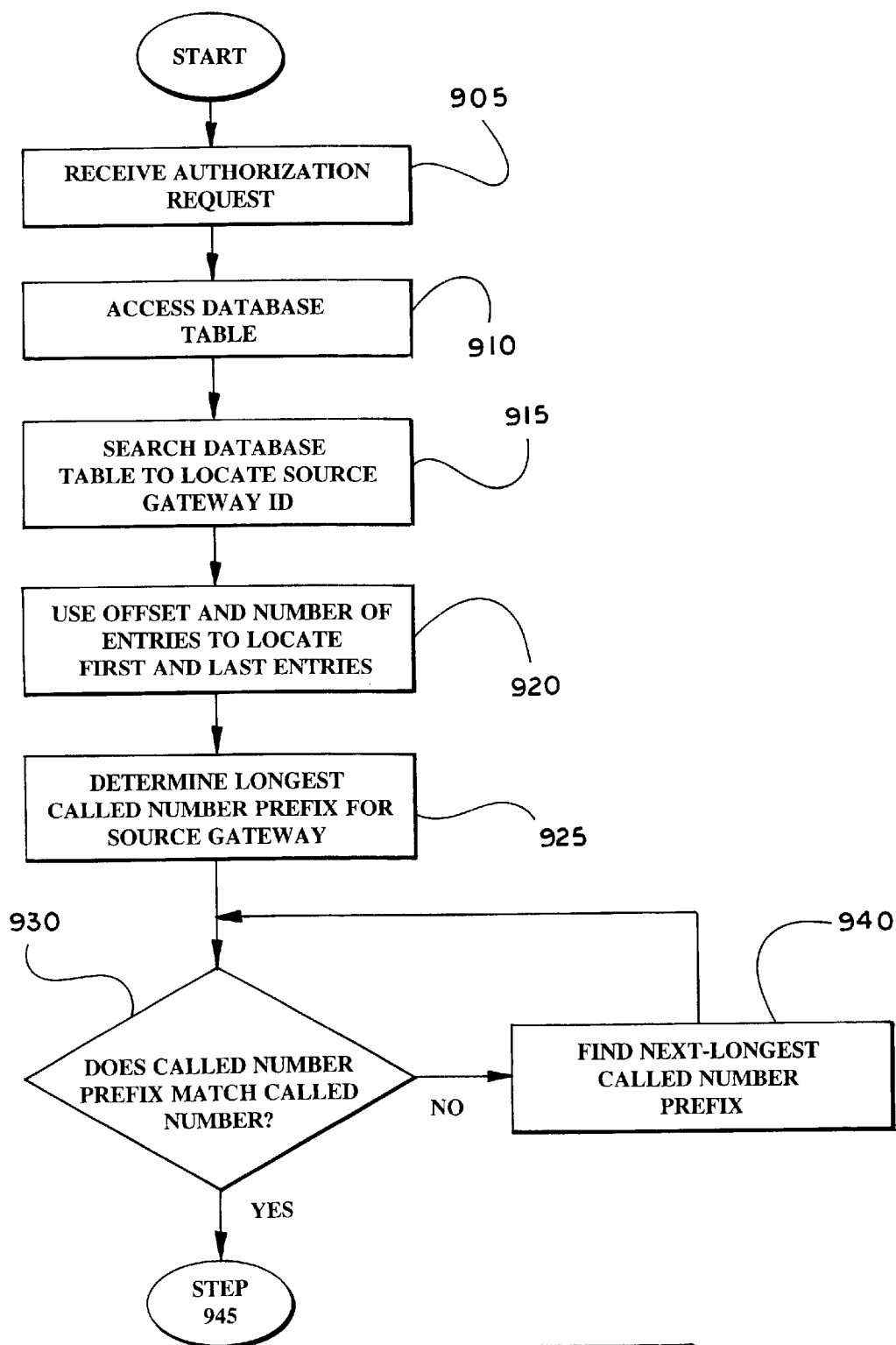
FIG. 9A describes an exemplary method by which a routing engine may access a database table to locate preferences for a source gateway.

FIGS. 9A and 9B describe an exemplary method by which a routing engine 110 may access a database table 801 to locate the preferences for a source gateway 108. At step 905, a outing engine 110 receives an authorization request from a source gateway 108, via an authentication server 602. The authorization request includes the identification number 802 of the source gateway 108. At step 910, the routing engine 110 accesses the database table 801 to locate the preferences corresponding to the source gateway identification number 802. First at step 915, a search of the appropriate database column is conducted to locate the source gateway identification number 802. A binary search is a quick and effective method of searching for the desired gateway identification number 802.

At step 920, an offset value 826 and a 'number of entries' value 824 are checked to determine the location of the first and last set of preferences for a given source gateway identification number 802. Many times, a source gateway operator 109 will designate multiple sets of preferences, each to be applied in circumstances defined by designated preference criteria. Therefore the database table 801 maintains an offset value 826 so that the routing engine is able to locate the first and last record for a given gateway identification number 802.

Once the first and last record for the desired gateway identification number 802 is located, a search is conducted at step 925 on all included entries to determine the longest called number prefix 804 corresponding to the gateway identification number 802. The size 816 of the longest called number prefix may be stored in the database table 801 for searching convenience. Again, a binary search is likely to be the most efficient way to search for the longest called number prefix. Once the longest called number prefix 804 is located, it is checked at step 930 to see if it matches the called number for the Internet telephony call, as supplied by the source gateway 108. If, at step 930, all digits in the longest called number prefix 804 are not found in the called number the called number prefix is not considered to match the called number. In that case, the preferences corresponding to the longest called number prefix 804 will not apply to the call and the next longest called number prefix 804 is located at step 940. The matching process is repeated until a matching called number prefix 804 is located.

When a matching called number prefix 804 is located, a determination is made at step 945 as to whether the source gateway 108 has a rate plan corresponding to the called number prefix. If no rate plan is found, the method returns to step 940 to locate the next-longest called number prefix 804. If a rate plan is found, however, a determination at step 950 is made as to whether the called number is excluded from the rate plan. If the called number is excluded from the rate plan, the method again returns to step 940 to locate the next-longest called number prefix 804.

If it is determined that the called number is not excluded from the rate plan, a determination is made at step 955 as to whether the source gateway 108 has received permission from the service point operator 125 to access the service point. Permission may be based on a finding that the source gateway operator 109 has secured sufficient funds. If permission has not been received by the source gateway 108, the method exits at step 975. Proceeding, a determination is next made at step 960 as to whether the rate plan of the source gateway 108 is effective. If the effective date of the rate plan is in the future, the preferences set by the source gateway 108 cannot yet be applied. Similarly, at step 965, the start day, 808 start hour 810, end day 812 and end hour 814 are checked to determine validity with respect to the current day and time. If the rate plan is not in effect or the time of day or day of week are not valid, the method returns to step 940 to locate the next-longest called number prefix. When a record is encountered that satisfies all called number prefix 804 and date and time requirements, the corresponding price preference 820 is considered to apply to the call. This price preference is read at step 970 and the method terminates at step 980. Those skilled in the art will recognize that the above described method may be used to locate other preferences of the source gateway 108, such as a delay preference, an AS hop count preference and, but not limited to, any other preference mentioned above.

Once the preferences of the source gateway 108 are located, the routing engine 110 must locate an eligible destination gateway 114. FIG. 10 shows that a database table 1001 for storing information relating to a destination gateway 114 may be sorted by terminating number prefix 1002 and then by destination gateway identification number 1004. In this way, the database table 1001 may be conveniently searched by the "trie" method. It is anticipated that the database table 1001 will store up to several millions of entries. It has been determined that a trie method is the most efficient way to access the appropriate data. However, as will be appreciated by those of ordinary skill in the art, any data access method may be employed.

FIGS. 11 A, 11B and 11C show an exemplary method that may be used by the routing engine 110 to locate eligible gateways in a database table 1001. First, at step 1102, the routing engine 110 accepts the called number from the source gateway 108. Next, at step 1104, the routing engine 110 searches for terminating number prefixes 1002 that match the called number, so as to locate a plurality of destination gateways 114 that may be able to terminate the call. As mentioned, an effective method for locating matching terminating number prefixes 1002 in the database is a well-known trie function.

If no matching terminating number prefixes 1002 are located at step 1105, the method ends at step 1150. For each matching terminating number prefix 1002 that is located, the corresponding destination gateway may be put through an set of initial "pre-screening" tests in order to determine if it is a potential destination gateway that is able to terminate the call. At step 1106, a destination gateway is identified that corresponds to a matching terminating number prefix 1002. Then, at step 1107 a determination is made as to whether the destination gateway 114 is functionally able to terminate the call. For one reason or another, a given destination gateway 114 may be disconnected, disabled, or otherwise taken off-line. Such off-line destination gateways are eliminated from consideration as potential destination gateways 114. Thus, if the destination gateway 114 is not functionally able to terminate the call, the method proceeds to step 1224, where a determination is made as to whether any other matching terminating number prefixes 1002 were found.

At step 1108 a determination is made as to whether the terminating gateway 114 has received permission from the service point operator 125 to conduct transactions with the routing engine. To reiterate, permission may be based on any subjective factors, including the amount of funding available to the destination gateway 114. If permission has not been granted by the service point operator 125 the method proceeds to step 1124, where a determination is made as to whether any other matching terminating number prefixes 1002 were found.

If the destination gateway 114 has been granted permission, a determination is made at step 1110 as to whether the destination gateway 114 is interoperable (compatible) with the source gateway 108. If the destination gateway 114 is not interoperable with the source gateway 108, the method proceeds to step 1124, where a determination is made as to whether any other matching terminating number prefixes 1002 were found.

If the destination gateway 114 is compatible with the source gateway 108, a determination is made at step 1112 as to whether the destination gateway 114 has a rate plan in effect. Again, if no effective rate plan exists, a search is made for additional matching terminating number prefixes 1002 at step 1124. If an effective rate plan exists, a determination is made at step 1114 as to whether the requested type of service is supported. As mentioned, the source gateway 108 may request various services such as voice, fax, data, etc. If the destination gateway 114 does not support the requested service, the method proceeds to step 1124 to search for another potential destination gateway 114.

However, if the destination gateway 114 does support the requested service, a determination is made at step 1118 as to whether the rate plan specifies a termination price for the present time and date. Once again, if the termination price is not valid for the present time and date, the method proceeds to step 1124 to search for another matching terminating number prefix. Otherwise, a determination is made at step 1120 as to whether the called number is excluded or "blocked" by the destination gateway 14. As an example, a destination gateway may be programmed to terminate all calls to the United States, except "1-976" calls. If the called number is excluded, the method moves to step 1124 to search for another matching terminating number prefix. If the called number is not excluded, the destination gateway 114 has passed all of the "pre-screening" tests and is considered to be a potential destination gateway. The terminating number, address and other information relating to the potential destination gateway 114 is stored in a "first-pass" list at step 1122.

Next at step 1124, a determination is made as to whether any other matching terminating number prefixes 1002 were found. If so, the above described steps are repeated until all potential destination gateways 114 have been added to the first-pass list. Otherwise, the method proceeds to step 1130 where the first-pass list is sorted by destination gateway identification number 1004 and by the number of digits in the terminating number prefix 1002 (in descending order). Then, at step 1132, the entries for the first-listed potential destination gateway are searched to locate the longest terminating number prefix 1002 for that destination gateway that matches the called number.

At step 1134, a determination is made as to whether the potential destination gateway 114 is able to terminate the call to the longest matching terminating number prefix while satisfying the preferences set for the source gateway 108. If the potential destination gateway is able to terminate the call while satisfying the source gateway 108 preferences, the potential destination gateway 114 information is stored in a second-pass list of remaining potential destination gateways 114 at step 1138. Subsequently, at step 1140, a determination is made as to whether any other potential destination gateways are in the first-pass list. If so, the entries for the next potential destination gateway are searched to locate the longest terminating number prefix. The method then returns to step 1134 and is repeated for every potential destination gateway in the first-pass list.

When complete, the second-pass list of remaining potential destination gateways 114 is sorted at step 1142 according to a pre-determined ranking system. As mentioned, the ranking system may be designated by the source gateway operator 109 and may be such that a certain weight is to be accorded to each source gateway preference. Alternately, the ranking system may be designated by the service point operator 125. At step 1144 all potential destination gateways 114 having a duplicate rank are sorted in random order. Lastly, at step 1148, a configurable number of the prioritized potential destination gateways 114 are returned to the source gateway 108. The number of returned prioritized potential destination gateways may be specified by the source gateway operator 109 or by the service point operator 125. The exemplary method terminates at step 1150.

As shown in FIG. 12, the internal architecture of an exemplary routing engine 110 comprises several interrelated components. These components will be described in detail to provide a further understanding of how to implement the exemplary routing engine 110. However, those skilled in the art should recognize that the architecture of FIG. 12 is provided by way of example only and is not intended to limit the scope of the invention to components shown.

A call router 1202 is the component that is actually responsible for receiving call authorization requests and returning a set of eligible terminating gateways to the authentication server. It is possible to run several call routers 1202 at the same time on a single routing engine 110. A call router 1202 can be configured to use one or more threads to process incoming transactions. Also, the call router 110 can be configured not to use threads at all, effectively acting as a single-threaded program.

In order to determine how to route a call, a call router 1202 needs information regarding the source gateway 108 and the destination gateway 114 such as pricing, exchange rates and other preferences. This information is stored in a central database 120 and is periodically transferred to a local database 1204 that resides on every routing engine 110. For performance reasons, the call router 1202 does not access the local database 1204 directly. Instead, the call router 1202 uses a set of reference files 1208 that contain all information needed to route calls, but in a format that is much faster to access than a database table. The reference files are created periodically by the reference file extractor 1210. The reference file extractor is also responsible for notifying all call routers 1202 when a new set of reference files 1208 is created. In addition, all call routers 1202 periodically (a few times per hour) check for the existence of a new set of reference files 1208, just in case a message from the reference file extractor 1210 is lost. There is no requirement for all call routers 1202 to switch to a new set of reference files 1208 at exactly the same time, due to the fact that all information contains effective dates, which must be at least twenty-four hours in the future.

Each call router 1202 memory-maps the reference files 1208 in read-only, shared mode. This means that all processes and threads using the same set of reference files 1208 will effectively share memory. Thus, if a total of ten call routers 1202 are accessing a set of reference files 1208 occupying 60 MB, the total memory usage will be 60 MB and not 10*60 MB.

As mentioned, the reference file extractor 1210 is responsible for creating reference files 1208 used by the call router 1202 to decide how to route calls. The reference file extractor 1210 extracts information from the local database 1204 and creates a set of four files: a first file relating to originating gateways, their pricing criteria, numbers, etc.; a second and third file relating to terminating gateways, their pricing criteria, numbers, etc.; and a fourth file relating to exchange rates. Either the whole set of reference files 1208 is successfully created or not at all. The base file name is the same for every file in a set, the file extensions are different. A unique base file name is generated for every set. Once a set of reference files 1208 is created, the file extractor 1210 notifies all call routers 1202 that new files are present.

All references between data entities within each reference file 1208 as well as across files are expressed as record numbers relative the beginning of the file being referenced. That means the same set of reference file 1208 can be used at the same time by different processed in read-only mode.

In one implementation, the file extractor 1210 may completely re-create all reference files 1208 every time it runs; (e.g. once/hour), provided that data in the tables has changed since the last execution. It take at most thirty seconds (on Ultra2) to completely re-create all information for 5000 destination and source called numbers (total 10000 numbers); that includes the time required to retrieve the data from the local database 1204. All sorting, etc. is done by the file extractor 1210 itself, not by the local database 1204.

Another implementation of the file extractor may create incremental reference file sets 1208 to be merged with previous sets, so as to create new versions. Alternately, the file extractor 1210 may construct an index for accessing every reference file 1208 or store the data as linked lists to allow for very frequent insertions and deletions without having to physically sort any data.

The file extractor 1210 is also responsible for near-real time deactivation of gateways. When instructed to do so, the file extractor 1210 may update relevant reference files 1208 in each set to indicate that a gateway has been deactivated. The file extractor 1210 updates reference files 1208 by memory mapping the reference files 1208 in shared, writeable mode, looking up entries belonging to the gateway to be deactivated and modifying the entries. When finished, the file extractor makes the changes visible to other programs, e.g. to the call router 1202. The process of deactivating gateways may be executed concurrently with the execution of call routers 1202 and does not require any explicit synchronization between such components.

While this invention has been described in detail with particular reference to preferred embodiments thereof, it will be understood that variations and modifications can be effected within the spirit and scope of the invention as described hereinabove and as described in the appended claims.

We claim:

1. A method for determining a preferred route for a call that is to be routed over an IP network comprising:
    accepting from a source gateway operator a preference corresponding to a source gateway;
    accepting a called number from the source gateway;
    identifying a plurality of potential destination gateways that are capable of terminating the called number;
    filtering the potential destination gateways based on the preference from the source gateway, so as to yield one or more remaining destination gateways;
    prioritizing the remaining destination gateways according to a predetermined ranking system;
    supplying the addresses of the prioritized remaining destination gateways to the source gateway.

2. The method of claim 1, wherein the source gateway successively attempts to establish the call with each prioritized remaining destination gateway until the call is established.

3. The method of claim 1, wherein the source gateway operator also sets a preference criteria that indicates circumstances in which the preference is to be applied.

4. The method of claim 1, wherein the preference relates to a determination of autonomous system matching.

5. The method of claim 1, wherein the preference relates to a determination of domain matching.

6. The method of claim 1, wherein the preference relates to a determination of specified platform system matching, the platform being specified by the source gateway operator.

7. The method of claim 1, wherein the preference relates to a maximum autonomous system hop count.

8. The method of claim 1, further comprising the step of randomizing any of the prioritized remaining destination gateways that have a duplicate priority.

9. The method of claim 1, wherein the source gateway operator designates a number of the addresses of prioritized remaining destination gateways to be supplied to the source gateway.

10. The method of claim 1, wherein the call comprises a voice over IP call.

11. The method of claim 1, wherein the call comprises a video over IP call.

12. The method of claim 1, wherein the call comprises a fax over IP call.

13. A routing engine for assisting a source gateway in determining a preferred route for a call that is to be routed over an IP network comprising:
    a database for storing a set of source gateway preferences and a set of destination gateway preferences; and
    a call router operable to:
        accept a called number from the source gateway,
        identify a plurality of potential destination gateways that are capable of terminating the call to the called number,
        filter the potential destination gateways based on the source gateway preferences and the destination gateway preferences,
        prioritize remain destination gateways based on a predetermined ranking system set by a source gateway operator, and
        supply addresses of the prioritized remaining destination gateways to the source gateway.

14. The routing engine of claim 13 comprising a plurality of call routers.

15. The routing engine of claim 13, wherein the source gateway and a destination gateway are operated independently of each other.

16. The routing engine of claim 13, wherein the set of source gateway preferences are supplied by a source gateway operator via a web-site and are downloaded into the database.

17. The routing engine of claim 13, wherein the set of destination gateway preferences are supplied by a destination gateway operator via a web-site and are downloaded into the database.

18. The routing engine of claim 13, wherein the source gateway preferences relate to a maximum cost that the source gateway is willing to pay for the call.

19. The routing engine of claim 13, wherein the destination gateway preferences relate to a rate that the destination gateway will charge for the service of terminating the call.

20. The routing engine of claim 13, wherein the call comprises a voice over IP call.

21. The routing engine of claim 13, wherein the call comprises a video over IP call.

22. The routing engine of claim 13, wherein the call comprises a fax over IP call.

23. A method for routing a call over an IP network comprising:
supplying a source gateway preference and a called number to a third-party routing engine, the routing engine operable to:
locate a plurality of potential destination gateways for terminating the call,
filter the potential destination gateways based on the source gateway preference, so as to yield a set of remaining potential destination gateways, and
prioritize the remaining potential destination gateways;
receiving from the routing engine a list of the prioritized remaining potential destination gateways; and
in order of descending priority, successively attempting to route the call to each of the listed remaining potential destination gateways until the call is established.

24. The method of claim 23, wherein the source gateway preference relates to a maximum cost that the source gateway is willing to pay for the call.

25. The method of claim 23, wherein the source gateway preference relates to a determination of autonomous system matching.

26. The method of claim 23, wherein the source gateway preference relates to a determination of domain matching.

27. The method of claim 23, wherein the source gateway preference relates to a determination of specified platform matching.

28. The method of claim 23, wherein the source gateway preference relates to a maximum number of autonomous system hops that the source gateway will tolerate for the call.

29. The method of claim 23, wherein the source gateway preference relates to a determination of historical availability of the potential destination gateways.

30. The method of claim 23, wherein the source gateway preference relates to a preferred destination gateway operator.

31. The method of claim 23, wherein the source gateway preference relates to a preferred destination gateway.

32. The method of claim 23, wherein the source gateway preference relates to a maximum amount of packet loss that will be tolerated by the source gateway during the call.

33. The method of claim 23, wherein the source gateway preference relates to a maximum amount of latency that will be tolerated by the source gateway during the call.

34. The method of claim 23, wherein the call comprises a voice over IP call.

35. The method of claim 23 wherein the call comprises a video over IP call.

36. The method of claim 23, wherein the call comprises a fax over IP call.

37. A method for determining a preferred route for a call that is to be routed over an IP network comprising:
accepting from a source gateway operator a preference corresponding to a source gateway, wherein the preference relates to a maximum price that a source gateway is willing to pay for the call;
accepting a called number from the source gateway;
identifying a plurality of potential destination gateways that are capable of terminating the called number, wherein the plurality of potential destination gateways each supply a rate plan;
filtering the potential destination gateways based on the preference from the source gateway, so as to yield one or more remaining destination gateways, wherein filtering the potential destination gateways comprises eliminating all potential destination gateways charging a rate that is greater than a maximum price that the source gateway is willing to pay;
prioritizing remaining destination gateways according to a predetermined ranking system;
supplying the addresses of the prioritized remaining destination gateways to the source gateway.

38. The method of claim 37, wherein prioritized a plurality of remaining destination gateways comprises ranking the plurality of remaining destination gateways from the lowest rate charged for terminating the call to the highest rate charged for terminating the call.

39. The method of claim 38, wherein a plurality of remaining destination gateways are further ranked according to autonomous system matching.

40. A method for determining a preferred route for a call that is to be routed over an IP network comprising:
accepting from a source gateway operator a plurality of preferences and a plurality of preference criteria corresponding to a source gateway;
accepting a called number from the source gateway;
identifying a plurality of potential destination gateways that are capable of terminating the called number;
filtering the potential destination gateways based on the preference from the source gateway, so as to yield one or more remaining destination gateways:
prioritizing the remaining destination gateways according to a predetermined ranking system;
supplying the addresses of the prioritized remaining destination gateways to the source gateway; and
determining from the preference criteria as to which of the preferences apply to the source gateway initiating the call.

41. The method of claim 40, wherein identifying the plurality of potential destination gateways comprises identifying a plurality of destination gateways that are able to terminate any portion of the called number.

42. A method for determining a preferred route for a call that is to be routed over an IP network comprising:
accepting from a source gateway operator a preference corresponding to a source gateway;
accepting a called number from the source gateway;
identifying a plurality of potential destination gateways that are capable of terminating any portion of the called number;
filtering the potential destination gateways based on the preference from the source gateway, so as to yield one or more remaining destination gateways;
prioritizing the remaining destination gateways according to a predetermined ranking system;
supplying the addresses of the prioritized remaining destination gateways to the source gateway.

43. The method of claim 42, further comprising the step of eliminating from consideration each of the destination gateways that do not have a rate plan in effect for the time and date of the call.

44. The method of claim 42, further comprising the step of eliminating from consideration each of the destination gateways that do not support the service requested by the source gateway.

45. The method of claim 42, further comprising the step of eliminating from consideration each of the destination gateways that do not operate with the source gateway.

46. The method of claim 42, further comprising the step of eliminating from consideration each of the destination gateways that have not been granted permission to terminate the call.

47. A method for routing a call over an IP network comprising:
supplying a source gateway preference, a called number, and a pre-determined ranking system to a third-party routing engine, the routing engine operable to:
locate a plurality of potential destination gateways for terminating the call,
filter the potential destination gateways based on the source gateway preference, so as to yield a set of remaining potential destination gateways, and
prioritize the remaining potential destination gateways according to the ranking system;
receiving from the routing engine a list of the prioritized remaining potential destination gateways; and
in order of descending priority, successively attempting to route the call to each of the listed remaining potential destination gateways until the call is established.

48. The method of claim 47, wherein a plurality of source gateway preferences are supplied to the routing engine; and wherein the ranking system specifies a weight that is to be accorded to each source gateway preference when prioritizing th remaining potential designation gateways.

49. The method of claim 48, wherein the ranking system specifies that a highest priority is to be assigned to a least cost source gateway preference.

* * * * *